(12) United States Patent
Abe

(10) Patent No.: US 6,678,069 B1
(45) Date of Patent: Jan. 13, 2004

(54) IMAGE FORMATION APPARATUS, IMAGE PROCESSING APPARATUS, IMAGE SYNTHESIS METHOD, IMAGE PROCESSING METHOD AND STORAGE MEDIUM

(75) Inventor: Yoshinori Abe, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,894

(22) Filed: Jun. 29, 1999

(30) Foreign Application Priority Data

Jul. 1, 1998 (JP) .......................................... 10-199492

(51) Int. Cl.7 .............................................. G06F 15/00
(52) U.S. Cl. ....................... 358/1.18; 358/450; 358/540
(58) Field of Search ............................... 358/1.11, 1.12, 358/1.13, 1.14, 1.15, 1.16, 1.17, 1.18, 450, 540

(56) References Cited

U.S. PATENT DOCUMENTS 5,867,282 A * 2/1999 Fredlund et al. ............. 358/450
6,151,421 A * 11/2000 Yamada ....................... 358/540

* cited by examiner

Primary Examiner—Mark Wallerson
(74) Attorney, Agent, or Firm—Fitzpatrick, Cella, Harper & Scinto

(57) ABSTRACT

Controlling is performed such that image data input from an image readout unit for reading an original or input a computer have been previously stored as plural form images in an image storage unit, the arbitrary form image is read for each page in response to form designation operation at an operation unit, and a form image selection method is set to be different for each of plural operation modes of an image formation apparatus, in order to remarkably improve working efficiency in case of form image synthesis.

57 Claims, 22 Drawing Sheets

FIG. 19

IMAGE FORMATION APPARATUS, IMAGE PROCESSING APPARATUS, IMAGE SYNTHESIS METHOD, IMAGE PROCESSING METHOD AND STORAGE MEDIUM

BACKGROUND OF THE INVENTION

1. Field of the Invention

The present invention relates to an image formation apparatus and an image processing apparatus for synthesizing an input image and a form image and outputting synthesized data.

2. Related Background Art

Conventionally, a digital copying machine having an electronic sort function has been known. The sort function is to read images of all documents to be copied, once store obtained image data into a memory such as a hard disk or the like, repeatedly read the image data of the desired original from the memory, and print the read image data. Thus, even if the copying machine does not have a sorter containing plural bins, it is possible to discharge copy sheets (i.e., paper sheet onto which image has been copied) in a sorted state.

Further, one control method can be applied. That is, in parallel with the operation that the image data stored in the memory is repeatedly read and printed, original data in another job is written and stored into a vacant area other than the area used for the printing in the memory. Then, if the copying job for the priorly printed original ends, the original later read and stored into the memory is printed. In this case, the time necessary to read and store the original in the later job is overlapped with the time necessary to priorly print the original, whereby it is possible to shorten an entire copying job time.

Similarly, a copying machine having a printer function for a computer has been known. This printer function is to input printing data from an external computer and print the input data by using the copying machine. For example, an original fed by an ADF (automatic document feeder) is read and once stored in a memory as image data. Then, while the stored image data is read and printed, the printing data is input from the external computer in parallel, the input data is written and stored into a vacant area other than the area used for the printing in the memory, and then the input data from the external computer is printed after the copying job of the priorly printed original ends. In this case, also, the time necessary to read and store the original in the later job is overlapped with the time necessary to priorly print the original in the prior job, whereby it is possible to shorten an entire copying job time.

In the above image formation apparatus having the memory such as the hard disk or the like for storing the image data of numerous pages, in addition to the electronic sort function, it has been proposed a device for previously registering plural form images (i.e., table, illustration and the like), synthesizing the read image and the form image, and then outputting the synthesized image.

However, the following problems occur in the above conventional image formation apparatus capable of performing the image synthesis.

That is, in the image synthesis, it is impossible to designate the plural form images, but is merely possible to designate only desired one of them. Therefore, in case of performing the image synthesis for the plural-page images, it is merely possible to synthesize each of these images and only one kind of form image, whereby the purpose of the image synthesis is limited.

If it is necessary to synthesize the plural-page images and the different form images respectively, each of the image data of the plural pages and one form image are synthesized and output, and such the synthesis outputting is repeated plural times, whereby the images of the necessary pages are output. For this reason, since the entire operation is complicated, it is impossible to improve operation efficiency.

SUMMARY OF THE INVENTION

An object of the present invention is to provide an image formation apparatus, an image processing apparatus, an image synthesis method, an image processing method and a storage medium which all solved the above conventional problems.

Another object of the present invention is to provide an image formation apparatus, an image processing apparatus, an image synthesis method, an image processing method and a storage medium which can remarkably improve operation efficiency in synthesis of a form image.

Other objects, advantages and salient features of the present invention will become apparent from the detailed description which, taken in conjunction with the annexed drawings, disclose the preferred embodiments of the present invention.

BRIEF DESCRIPTION OF THE DRAWINGS

FIG. 19 is a view showing a display screen of the computer in a case where the form images from the computer are registered;

DETAILED DESCRIPTION OF THE PREFERRED EMBODIMENTS

Hereinafter, the embodiment of the present invention will be explained with reference to the annexed drawings.

Figure 1:
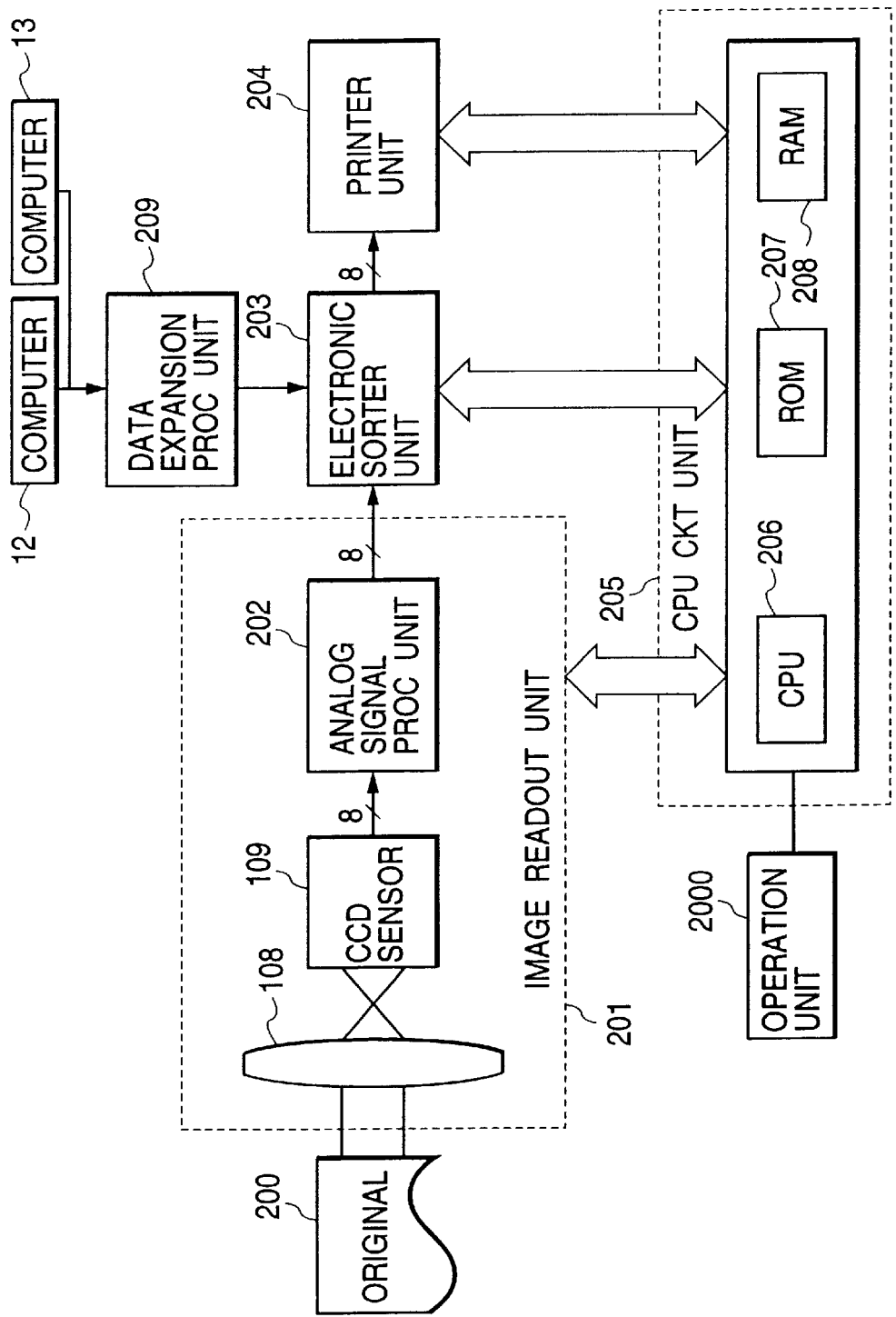
FIG. 1 is a block diagram showing the schematic structure of an image formation apparatus.
Figure 2:
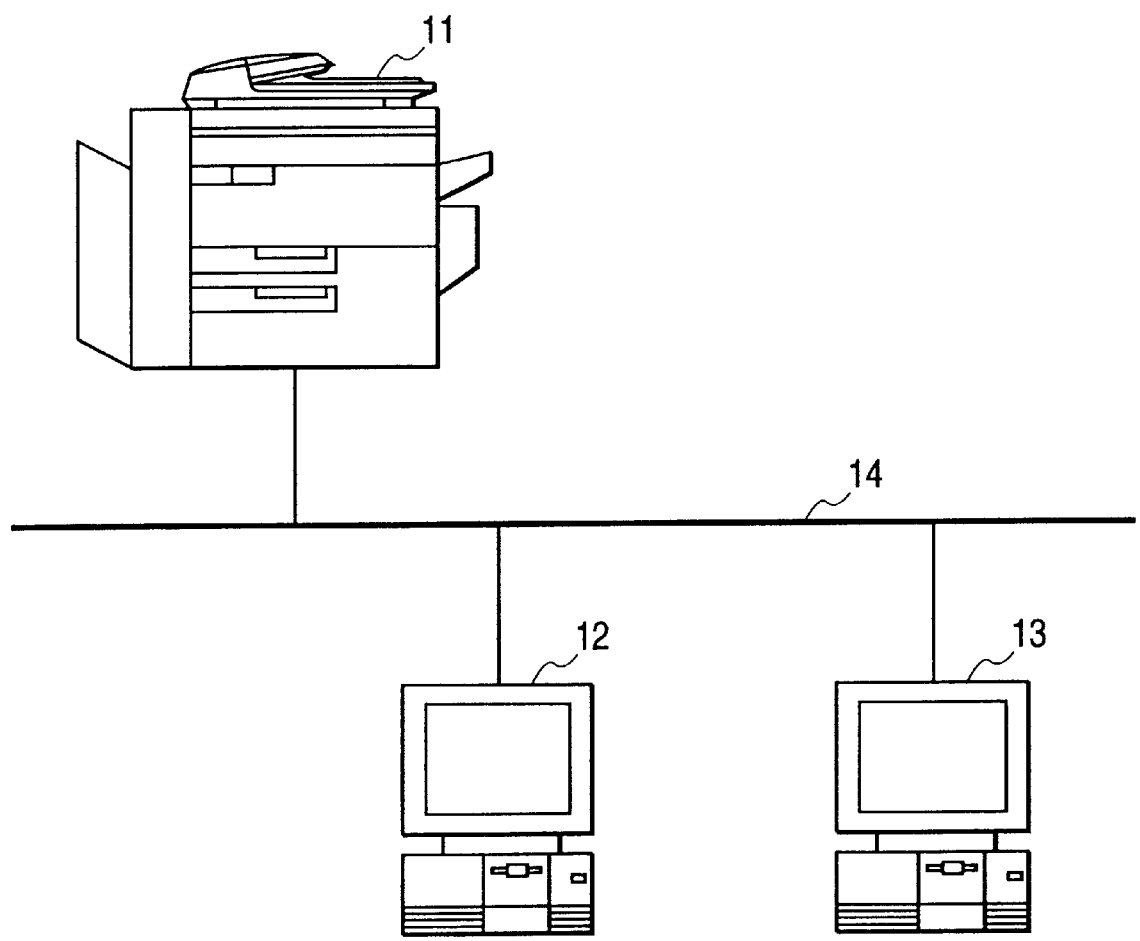
FIG. 2 is a view showing the state that the image formation apparatus shown in FIG. 1 is connected to computers through a network.
Figure 3:
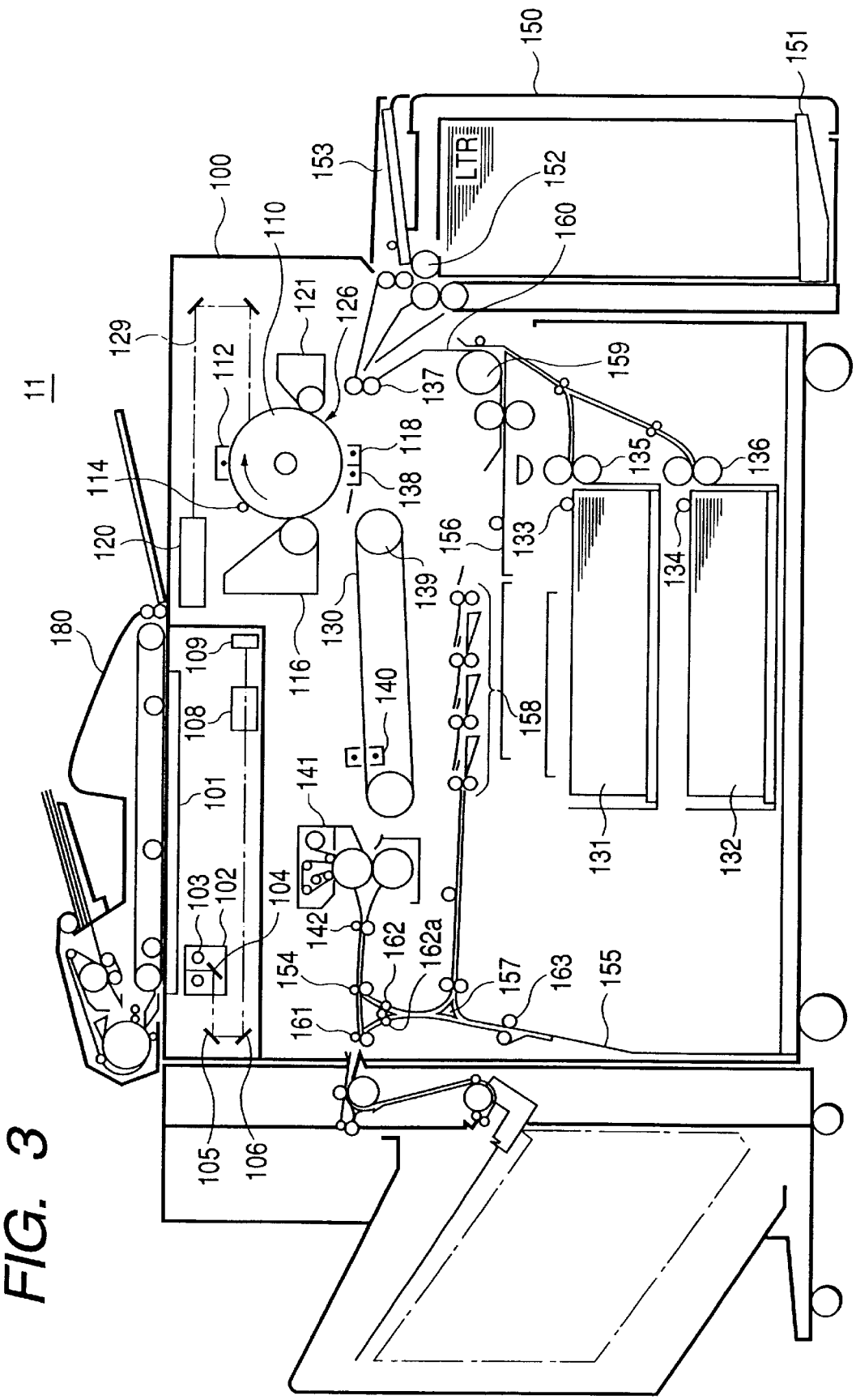
FIG. 3 is a sectional view showing an example of the image formation apparatus shown in FIG. 1.

FIG. 1 is a block diagram showing the schematic structure of an image formation apparatus, FIG. 2 is a view showing the state that the image formation apparatus shown in FIG. 1 is connected to computers through a network, and FIG. 3 is a sectional view showing an example of the image formation apparatus shown in FIG. 1.

In FIG. 2, numeral 11 denotes an image formation apparatus which contains an original readout unit, a data expansion process unit (i.e., printer board) for expanding print data from the computer into a bit image, and the like. The image formation apparatus 11 is the multifunctional machine which contains a memory such as a hard disk or the like for storing the image and can perform printing in addition to copying.

Numerals 12 and 13 respectively denote computers which cause the image formation apparatus 11 to print documents, figures and the like formed according to application software. Numeral 14 denotes a network which connects the image formation apparatus 11 with the computers 12 and 13 on the basis of a general-purpose protocol such as Ethernet.

The computers 12 and 13 can execute a mailbox function and a form image registration function, as well as the ordinary printing. The mailbox function is to start the printing of image data stored in the memory, by inputting a PIN (personal identification number) from an operation unit 2000 of the apparatus 11. The form image registration function is to register a form image to be synthesized in the image data input from the image readout unit or the computer. Further, a user can watch various information such as management information of the apparatus 11, a kind of registered form image and the lie, on the computers 12 and 13 through the network 14.

Subsequently, the structure of the image formation apparatus 11 will be explained with reference to FIG. 3.

In FIG. 3, numeral 100 denotes the body of a copying machine, numeral 180 denotes an RDF (rotary document feeder), numeral 101 denotes a platen glass acting as an original mounting board, and numeral 102 denotes a scanner composed of an original illumination lamp 103, a scan mirror 104 and the like.

The scanner 102 is reciprocated by a not-shown motor in a predetermined direction to scan an original. Then reflected light from the original is guided into an image sensor unit 109 such as a CCD sensor through scan mirrors 104, 105 and 106 and a lens 108.

Numeral 120 denotes an exposure control unit composed of a laser, a polygonal scanner and the like. The light is converted into an electrical signal by the image sensor unit 109 and subjected to a later-described predetermined image process by the exposure control unit 109. Then laser beam 129 modulated by the processed image signal in the unit 120 is irradiated onto a photosensitive drum 110. A primary charger 112, a preexposure lamp 114, a cleaning unit 116, a transfer charger 118 and a developing unit 121 are provided around the drum 110.

In an image formation unit 126, the photosensitive drum 110 is rotated by a not-shown motor in the direction indicated by the shown arrow. After the drum 110 is charged at predetermined potential by the primary charger 112, the laser beam 129 from the exposure control unit 120 is irradiated onto the drum 110, whereby an electrostatic latent image is formed. The formed image is developed and then visualized as a toner image by the developing unit 121.

On the other hand, a transfer paper sheet (referred as transfer sheet hereinafter) is fed from an upper cassette 131 by a pickup roller.133 or from a lower cassette 132 by a pickup roller 134. The fed sheet is carried to the body 100 by a paper feed roller 135 or 136, and then fed to a transfer belt 130 by a registration roller 137, whereby the visualized toner image is transferred onto the transfer sheet by the transfer charger 118. After then, the residual toner on the drum 110 is cleaned up by the cleaning unit 116, and the residual charges are erased by the preexposure lamp 114.

After the image transfer ends, the transfer sheet is separated from the transfer belt 130, and the toner image is recharged by a prefixing charger 140. Then the sheet is carried to a fixing unit 141, the toner image is fixed to the sheet by pressing and heating, and the sheet is discharged outwardly by a discharge roller 142.

Numeral 138 denotes an adsorption charger by which the transfer sheet from the registration roller 137 is adsorbed to the transfer belt 130, and numeral 139 denotes a transfer belt roller which is used to rotate the belt 130 and cooperates with the charger 138 such that the transfer sheet is adsorbed to the belt 130 and charged.

A deck 150 capable of holding, e.g., 4000 transfer sheets is installed to the body 100. A lifter 151 of the deck 150 ascends according to the quantity of the held sheets such that the uppermost sheet is always in contact with a paper feed roller 152. Further, a manual multifeeder 153 capable of holding 100 transfer sheets is installed to the body 100.

In FIG. 3, numeral 154 denotes a paper discharge flapper which changes a paper feed path between a double-face (or two-face) recording side (or multirecording side) and a paper discharge side. The transfer sheet from the paper discharge roller 142 is guided to the double-face recording side or the multirecording side by the flapper 154. Numeral 158 denotes a lower carrying path which reverses the transfer sheet from the roller 142 through a reversal path 155, and guides the reversed sheet to a paper refeed tray 156.

Numeral 157 denotes a multiflapper which changes the path between the double-face recording side and the multirecording side. By shifting the multiflapper 157 leftward, the transfer sheet is directly guided to the lower carrying path 158 without using the reversal path 155. Numeral 159 denotes a paper feed roller which feeds the transfer sheet to the side of the photosensitive drum 126 through a path 160. Numeral 161 denotes a discharge roller which is arranged in the vicinity of the paper discharge flapper 154 and outwardly discharges the transfer sheet guided to the discharge side by the flapper 154.

In the double-face recording (double-face copying) or the multirecording (multicopying), the paper discharge flapper 154 is shifted upward, and the transfer sheet to which the copying has been ended (referred as copying-end sheet hereinafter) is stored on the paper refeed tray 156 in the reversal state (i.e., sheet is being reversed) through the paths 155 and 158. In the double-face recording, the multiflapper 157 is shifted rightward. In the multirecording, the lowermost sheet of the stack on the paper refeed tray 156 is fed one by one by the paper feed roller 159 and then guided to the registration roller 137 of the body 100 through the path 160.

When the sheet is reversed and discharged from the body 100, the paper discharge flapper 154 is shifted upward and the multiflapper 157 is shifted rightward, whereby the copying-end sheet is carried to the side of the carrying path 155. After the trailing edge of the sheet passes through a first carrying roller 162, the sheet is carried to the side of a second carrying roller 162a, and then the sheet is output by the discharge roller 161 in the reversal state.

Subsequently, the block structure of the image formation apparatus 11 will be explained with reference to FIG. 1.

In FIG. 1, an image readout unit 201 is composed of a CCD sensor 109, an analog signal process unit 202 and the like. The image of an original 200 guided into the CCD sensor 109 through a lens 108 is converted into the analog electrical signal by the sensor 109. The image information obtained in the conversion is input to the analog signal process unit 202 and subjected to an S/H (sampling-and-holding) process, dark level correction and the like. Then the information is subjected to an A/D (analog-to-digital) conversion process, the digitized signal is subjected to a shading correction process (for correcting dispersion of original readout sensor and light distribution characteristic of original illumination lamp) and a magnification changing (or zooming) process. After then, the processed signal is input to an electronic sorter unit 203.

On the other hand, a data expansion process unit 209 expands the image information input from the external computer 12 or 13, and outputs the expanded information to the electronic sorter unit 203 as the image data (or bit data). In the electronic sorter unit 203, the received image data is subjected to a correction process such as gamma correction or the like necessary in an output system, a smoothing process, an edge emphasis process and other processes. Then the processed data is output to the printer unit 204.

The printer unit 204 is composed of the exposure control unit 120, the image formation unit 126, the transfer sheet carrying control unit and the like explained in FIG. 3, and records the image on the transfer sheet in response to the input image signal.

A CPU circuit unit 205 is composed of a CPU 206, a ROM (read-only memory) 207, a RAM (random access memory) 208 and the like, and controls the image readout unit 201, the electronic sorter unit 203, the printer unit 204 and the like. Namely, the unit 205 integrally controls the operation sequence of the image formation apparatus. The instruction set at the operation unit 2000 of the image formation apparatus is input to the CPU circuit unit 205, and thus the unit 205 executes predetermined processes on the basis of the input instruction data.

Figure 4:
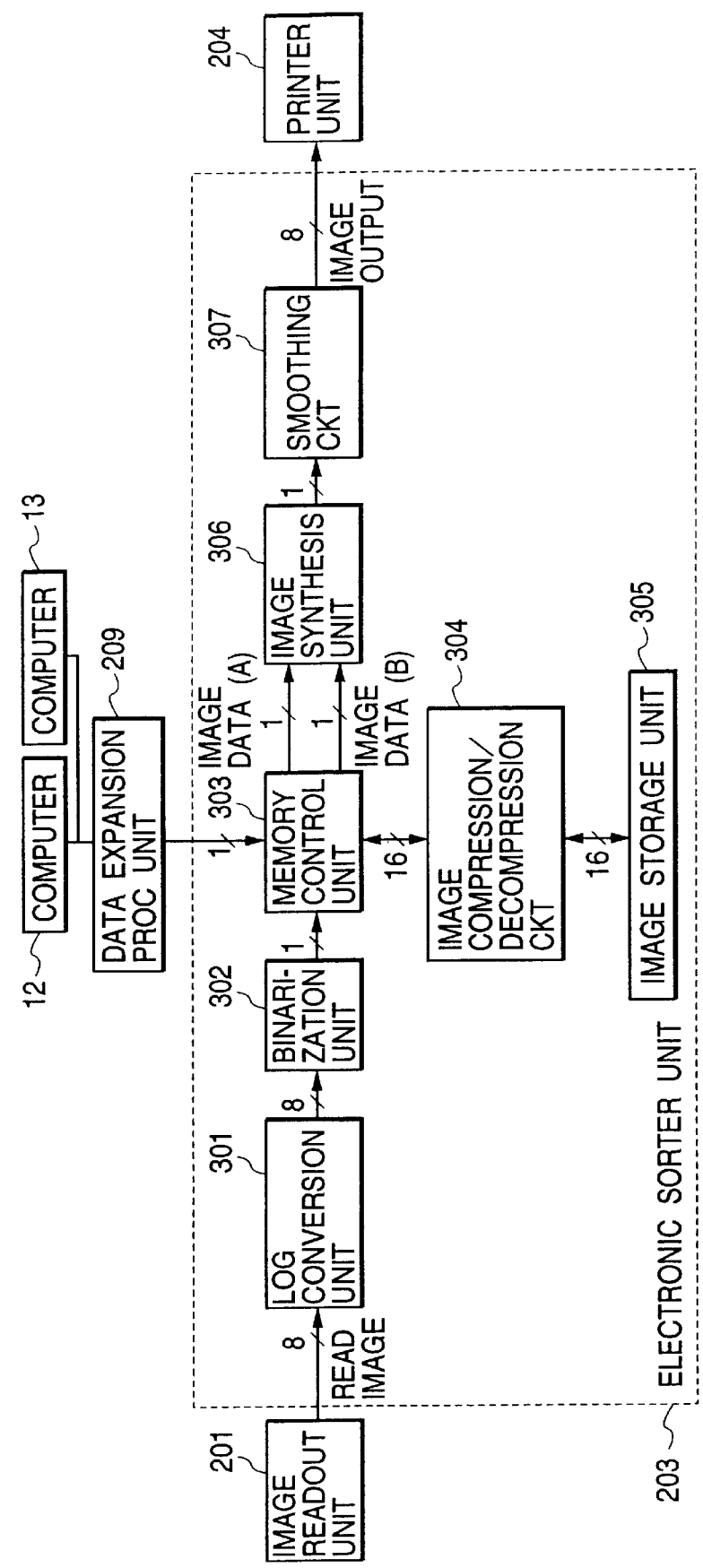
FIG. 4 is a block diagram showing the detailed structure of an electronic sorter unit 203.

FIG. 4 is the block diagram showing the detailed structure of the electronic sorter unit 203.

As shown in FIG. 4, the image from the image readout unit 201 is input as black luminance data and then transferred to a logarithmic conversion unit 301. The unit 301 containing an LUT (look-up table) converts the input luminance data into density data by outputting a table value corresponding to the input data.

After then, the density data is transferred to a binarization unit 302. In the unit 302, the multivalue density data is binarized to have the density value "0" or "255". The binarized eight-bit image data is converted into one-bit image data of "0" or "1", whereby it is possible to reduce the quantity of image data to be stored in the memory.

However, if the image is binarized, the number of gradations of the image is changed from "256" to "2". Thus, generally, if the image data representing, e.g., a photographic image including much halftone is binarized, since its image quality is seriously degraded, pseudo halftone expression based on the binary data is necessary. In the present embodiment, an error diffusion method is used as the method for performing the pseudo halftone expression based on the binary data. In this method, if the density of one image is larger than a certain threshold, such the density is considered to be represented by the density data of "255". On the other hand, if the density is equal to or smaller than the certain threshold, such the density is considered to be represented by the density data of "0". After the obtained density data is binarized, the difference between the actual density data and the binarized density data is considered as an error signal to be diffused to peripheral pixels. The error occurred due to the binarization is multiplied by a weighting coefficient on a previously prepared matrix, and the obtained value is added to the peripheral pixels, thereby performing the error diffusion. Thus, since the average value of the density is stored for the entire image, it is possible to perform the pseudo halftone expression based on the binary data.

The binarized image data is transferred to an memory control unit 303 containing a buffer memory such as a DRAM (dynamic random access memory) for an image layout process. Further, since the image data input from the computer 12 or 13 through the data expansion process unit 209 is ordinarily processed as the binary image data in case of the data expansion, such the image data is transferred to the memory control unit 303 as it is.

In the memory control unit 303, the original image to be printed is once stored in a later-described layout memory, the stored data is compressed by an image compression/decompression circuit 304, the compressed data is stored in an image storage unit 305. Then the stored image data are read from the unit 305 in sequence and decompressed by the circuit 304. The decompressed data is written into the layout memory and then output. When the image data is written into or read from the layout memory in the memory control unit 303, an image rotation process is performed according to necessity.

The image storage unit 305 contains an HD (hard disk) controller and a hard disk (i.e., memory). Thus, in the unit 305, the image data is written into the hard disk according to the instruction from the HD controller. The plural image data stored in the hard disk are then output in the order according to the operation mode designated by the operation unit 2000 of the copying machine or the computer. For example, in the sorting, the original from the RDF 180 is read in due order from its final page to first page of the sheaf, and the read data are once stored in the hard disk. The original image data once stored in the hard disk are then read in due order from final page to first page of the sheaf of original. Such the data reading is repeated plural times, and the read data are output. Thus, the electronic sorter unit 203 can act as a sorter containing plural bins.

The image data read from the image storage unit 305 is transferred to an image synthesis unit 306 through the layout memory in the memory control unit 303. The image synthesis unit 306 performs OR (logical sum) calculation of the two kinds of images and then synthesizes them. That is, the image data (A) and (B) output from the memory control unit 303 are input to the unit 306, and the input data are synthesized and output according to necessity. For example, in the synthesis process, the image data (A) corresponds to the image being printed, and the image data (B) corresponds to the form image previously registered in the image storage unit 305. On the other hand, if the synthesis process is not performed, the image data (A) is output as it is. Numeral 307 denotes a smoothing circuit which calculates the synthesized image data together with a coefficient on a predetermined matrix to correct an image edge portion. Then the processed image data is output to the printer unit 204.

Figure 5:
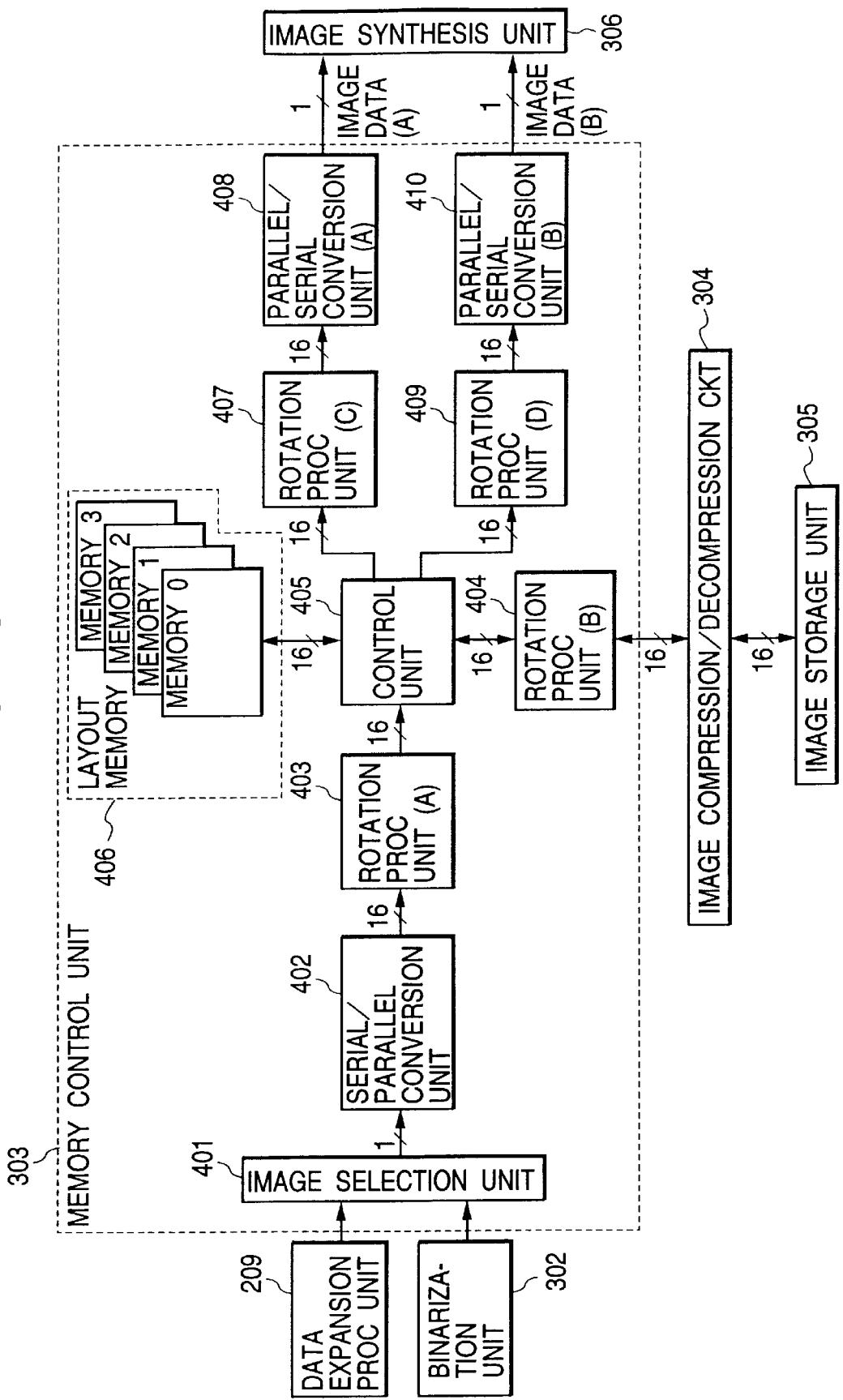
FIG. 5 is a block diagram showing the detailed structure of a memory control unit 303.

Subsequently, the structure of the memory control unit 303 will be explained with reference to FIG. 5.

The image data from the data expansion process unit 209 and the binarization unit 302 are input to an image selection unit 401, whereby the image data to be stored is selected. The selected image data being binary data is converted into 16-bit parallel data by a serial/parallel conversion unit 402. In fact, one-dimensional binary data is converted into 16-bit data (4 pixels×4 lines) by a not-shown four-line line memory.

Numeral 403 denotes a rotation process unit (A) which changes the arrangement of the 16-bit image data input from the serial/parallel conversion unit 402. Further, when the image data is written into the memory, the rotation process unit (A) 403 rotates the image data by changing the start value of a not-shown memory address. Numeral 404 denotes a rotation process unit (B) which changes the arrangement of the 16-bit input/output image from/to the image compression/decompression circuit 304. Further, when the data reading/writing is performed to the layout memory, the rotation process unit (B) 404 rotates the image by changing the start value of the memory address. Numeral 405 denotes a control unit which contains a control part and an address generation part. The control part controls the rotation process unit (A) 403, the rotation process unit (B) 404, a later-described layout memory 406, a rotation process unit (C) 407 and a rotation process unit (D) 409. The control unit 405 generates memory timing or the like to control the data reading/writing from/to the layout memory 406.

The layout memory 406 is made of, e.g., a semiconductor memory such as a DRAM or the like. In fact, in order to perform a high-speed reading/writing process to the input image data (bit image), the layout memory 406 is made of the DRAM having the capacity capable of storing, e.g., four-page A4-size data. In FIG. 5, the layout memory 406 is composed of memories 0, 1, 2 and 3. When the A4-size original is stored, the memories 0 and 1 are used as a double buffer. In the synthesis process, the memory 2 is used as the memory into which the form image is written. If the large-size (e.g., A3 size) original data is stored, the memories 0 and 1 and the memories 2 and 3 are used respectively as double buffers. Concretely, if the image data of resolution 600 dpi is stored, the capacity of about 18 Mbytes is necessary for such the binary image as in the present embodiment.

Numeral 407 denotes the rotation process unit (C) which changes the bit arrangement of the image data output from the layout memory 406. Further, when the image data is printed, the rotation process unit (C) 407 rotates and outputs the image by changing the start value of a memory address. Numeral 408 denotes a parallel/serial conversion unit (A) which converts the 16-bit image data stored in the memory into one-bit serial data to be printed. In fact, since the image data is composed of 16 bits (4 pixels×4 lines), the data corresponding to predetermined four pixels are read from among the 16 bits and converted into the serial data. The serial image data (A) converted by the parallel/serial conversion unit (A) 408 is transferred to the image synthesis unit 306, output to the printer unit 204, and then recorded. Similarly, numeral 409 denotes the rotation process unit (D) which changes the bit arrangement of the image data output from the layout memory 406. Further, when the image data is printed, the rotation process unit (D) 409 rotates and outputs the image by changing the start value of a memory address. Numeral 410 denotes a parallel/serial conversion unit (B) which converts the 16-bit image data stored in the memory into one-bit serial data to be printed. The serial image data (B) converted by the parallel/serial conversion unit (B) 410 is then output to the image synthesis unit 306.

Subsequently, the timing in a case where the electronic sorter operates actually with use of the layout memory 406 will be explained in detail.

Figure 6:
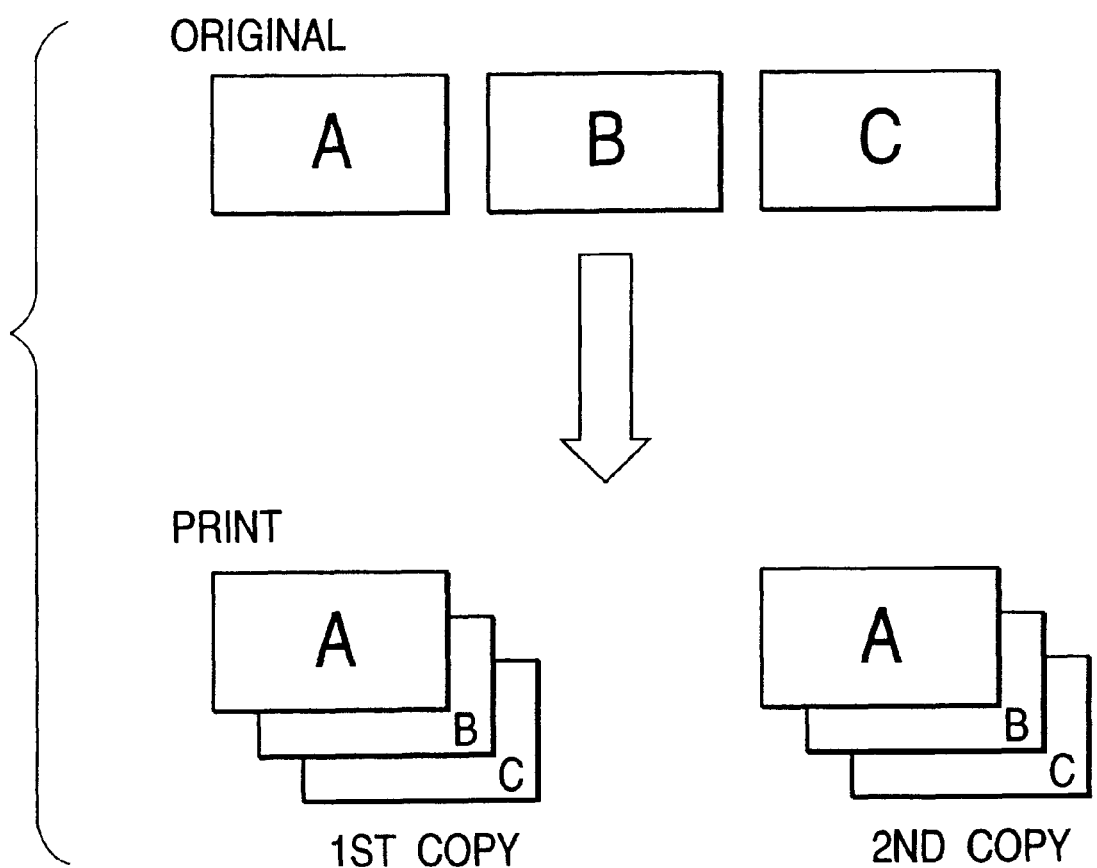
FIG. 6 is a view showing the relation between originals and prints in case of printing two copies of originals A, B and C.

FIG. 6 is the view showing the relation between originals and prints in case of printing two copies of originals A, B and C. When the original is read, the read image is stored in the hard disk of the image storage unit 305, and simultaneously the images of the first copy are printed. When the second and subsequent copies of the originals are printed, the data stored in the hard disk are read and output in sequence. At that time, it is unnecessary to read the original itself.

The operation timing in this example will be explained with reference to FIG. 7.

Figure 7:
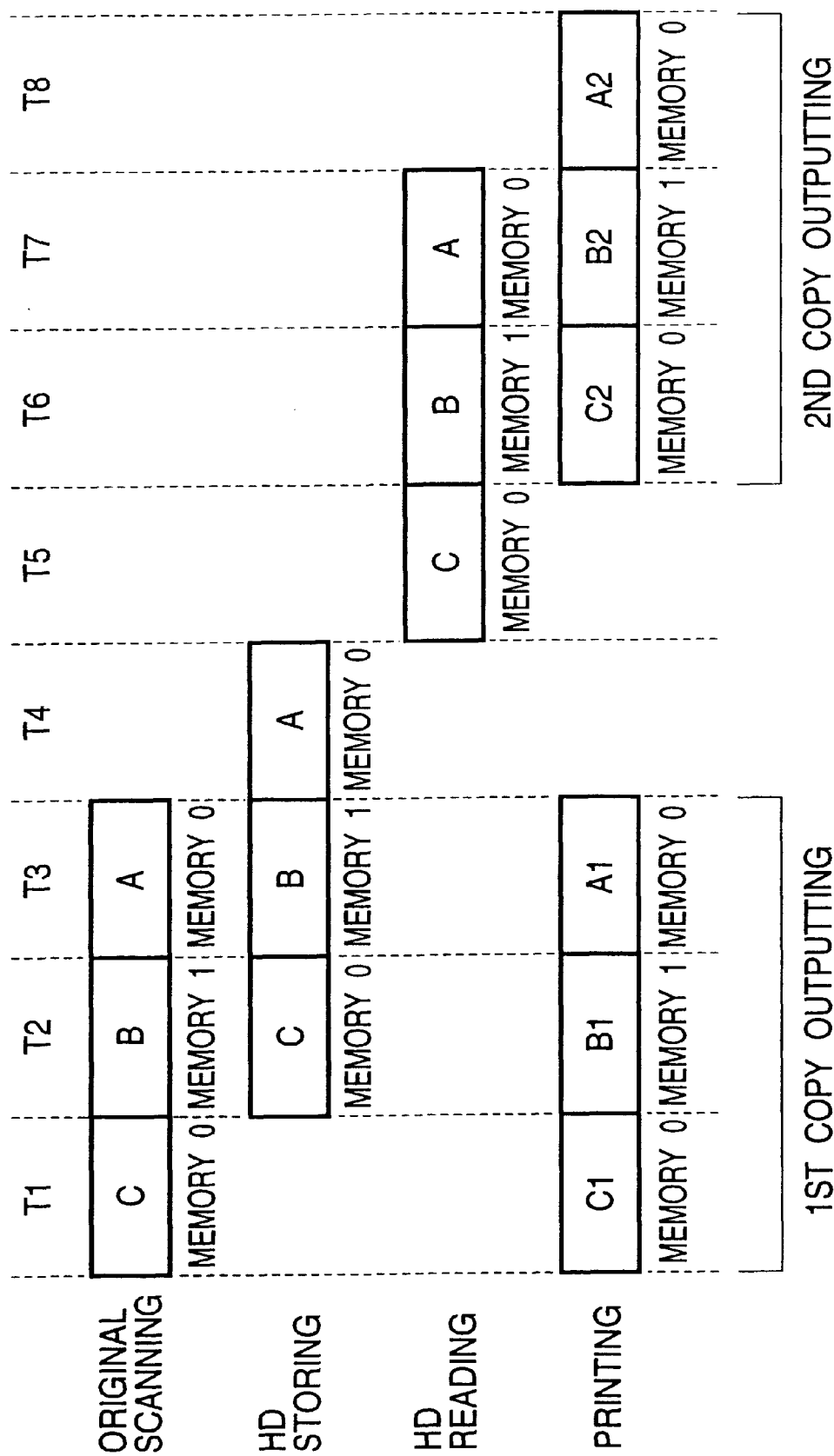
FIG. 7 is a view showing operation timing in the example shown in FIG. 6.

FIG. 7 shows the operation timing in the case where the memories 0 and 1 of the layout memory 406 are used as the double buffer. Concretely, FIG. 7 shows the operation timing of original scan (i.e., data writing into layout memory 406), HD storage (i.e., data reading from layout memory 406 and data writing into hard disk), HD reading (i.e., data reading from hard disk and data writing into layout memory), and printing (i.e., data reading from layout memory 406 and data recording). Further, symbols T1, T2, . . . , and T8 along the axis of abscissas respectively denote periods during which the above operations are performed. For convenience of explanation, all the periods are represented as having the identical time interval.

The originals A, B and C shown in FIG. 6 are fed by the RDF 180 to the platen glass 101 and then read by the scanner 102 in the order of originals C, B and A. Then the scanned originals are respectively written into the memory 0, the memory 1 and the memory 0 of the layout memory 406 in sequence.

In the period T1, the information of the original C written into the memory 0 is read slightly late and printed as an output (or print) C1 of the first copy. That is, the image data is written into the memory 0, and at substantially the same time the image data is read and printed, whereby it is possible to complete the printing of the first copy without waiting until all the originals are stored.

In the period T2, the next original B is scanned and written into the memory 1, and at substantially the same time the written image data is read, thereby obtaining a print B1 of the original B in the first copy. In this case, the image data of the original C written into the memory 0 in the period T1 is stored in the hard disk. As above, in the layout memory 406, while the image data is written into one memory, the image data is read from the other memory. Thus, since the layout memory 406 can act as the double buffer, it is possible to perform the entire operation at high speed.

Subsequently, in the period T3, the original A is read and printed, and the data of the original B is written into the hard disk. In the period T4, the data of the original A is written into the hard disk. At the time when the period T4 expires, the printing and the hard disk storage for the first copy of the originals A, B and C have ended.

In the periods T5, T6, T7 and T8, the image data stored in the hard disk are read in sequence, and the second copy of outputs C2, B2 and A2 are printed. Also in this operation, the memories 0 and 1 are used for alternate writing and reading operations.

Figure 8:
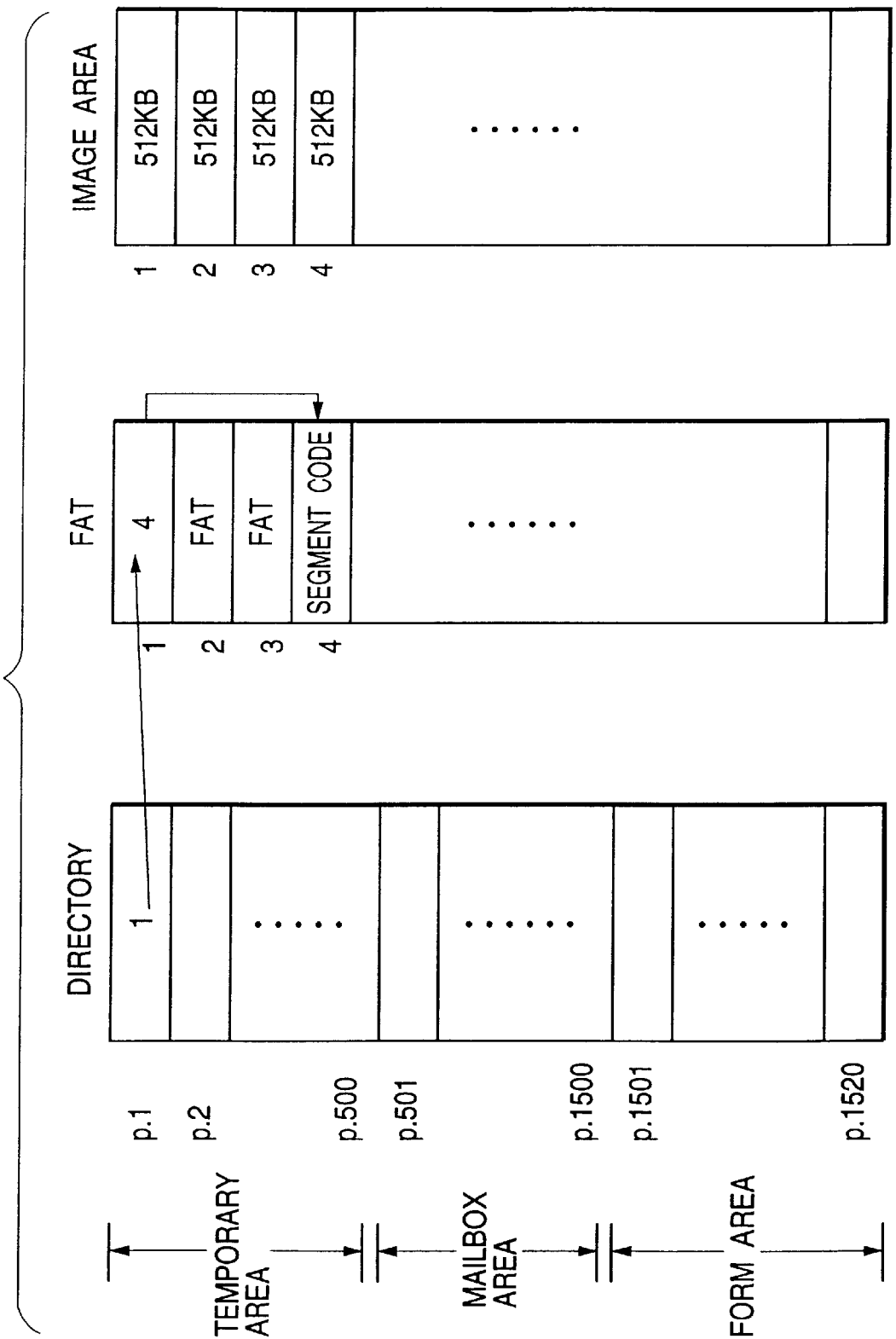
FIG. 8 is the view for explaining image data management and storage format in the hard disk used in an image storage unit.

FIG. 8 is the view for explaining image data management and storage format in the hard disk used in the image storage unit 305 according to the present embodiment.

The directory shown in FIG. 8 is the portion which performs the image data management in the unit of page. The directory includes the information stored in the RAM 208 of the CPU circuit unit 205 and the hard disk. For example, the numbers of dots in X and Y directions of the image, a head FAT (file allocation table) number, resolution, density information, and the number of image bytes before/after the data compression are stored in the directory. The above hard disk includes three areas, i.e., a temporary area, a mailbox area and a form area.

The temporary area is the portion in which the images to be sorted in the electronic sorting or the like are temporarily stored. After all the data are output, the temporary area is erased or released for the input of the image data in a next job. In the mailbox area, the image data to be printed from the external computer is stored. Since the image data stored in the mailbox area is printed when the operation unit of the image formation apparatus 11 designates the PIN or inputs a box number, the stored data is retained without erasure until an instruction is issued by a manager or the like. The form area is the portion in which the form image to be synthesized to the image data output from the temporary area or the mailbox area is stored. It should be noted that it is possible to store the plural form images in the form area.

The capacities of these three areas can be freely changed by the manager if these areas do not operate. The FAT represents the order indicating which portion in the image area of the hard disk the image data has been stored in. Further, the next FAT number is stored in the FAT, and a segment code (e.g., FFFFh) is stored at the final FAT. Like the directory information, the FAT has been stored in the RAM 208 and the hard disk. The FAT number is one-to-one corresponding to one block (512 Kbytes in FIG. 8) of the image area in the hard disk. In this example, since "1" is stored as the FAT number information of the page 1 of the directory, the FAT 1 is referred to. In the FAT 1, "4" is stored as the next FAT number. Since the segment code is stored in the FAT 4, it is concluded that the image on the page 1 is composed of the image areas 1 and 4. The number of image areas to be used is stored after the image data is compressed, whereby such the number differs according to the characteristic of the image.

As above, by only designating the page number to be output, it is possible to easily output the necessary image data stored in the hard disk.

Figure 9:
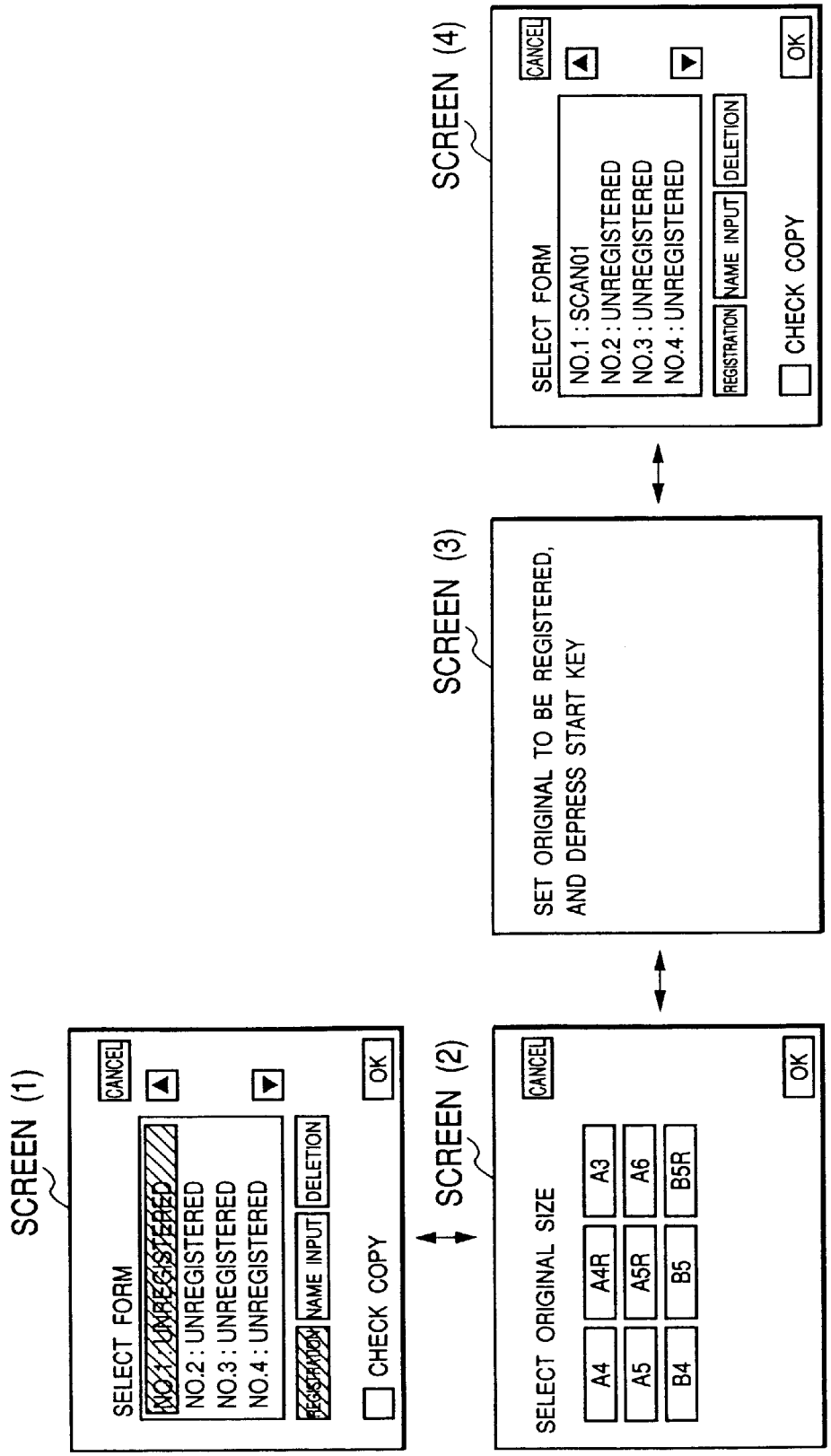
FIG. 9 is a view showing operation screens of an image formation apparatus 11 in a case where a form image is registered from an image readout apparatus.
Figure 10:
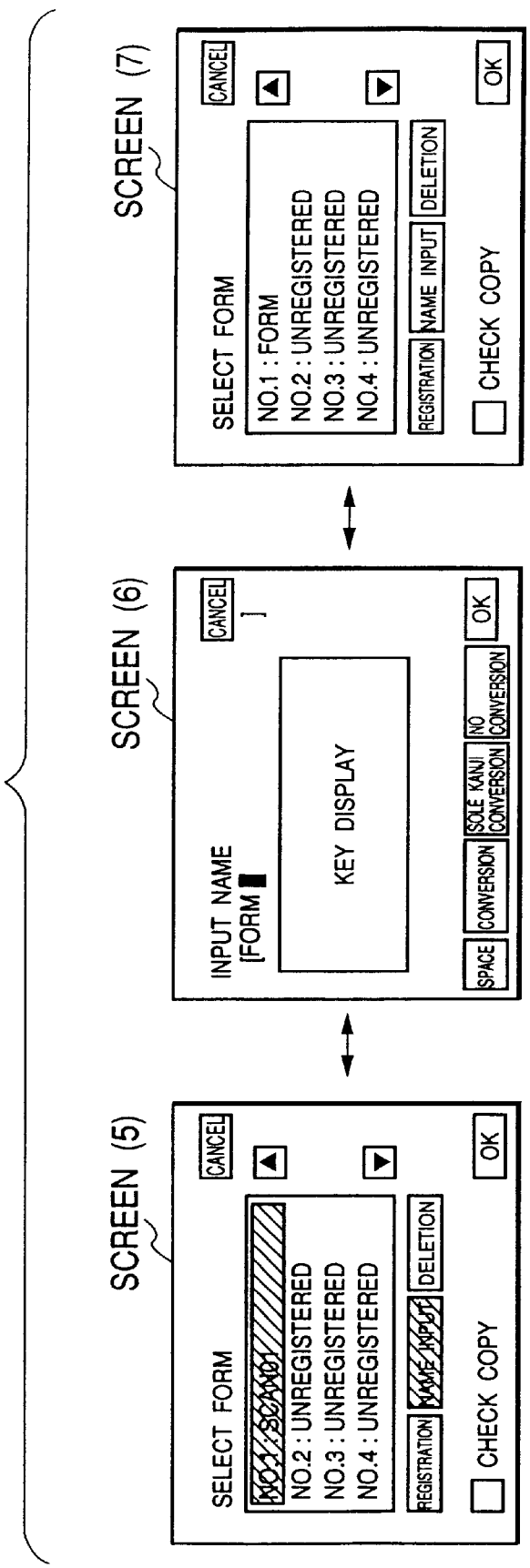
FIG. 10 is a view showing operation screens of the image formation apparatus 11 in a case where the name of the form image is input.
Figure 11:
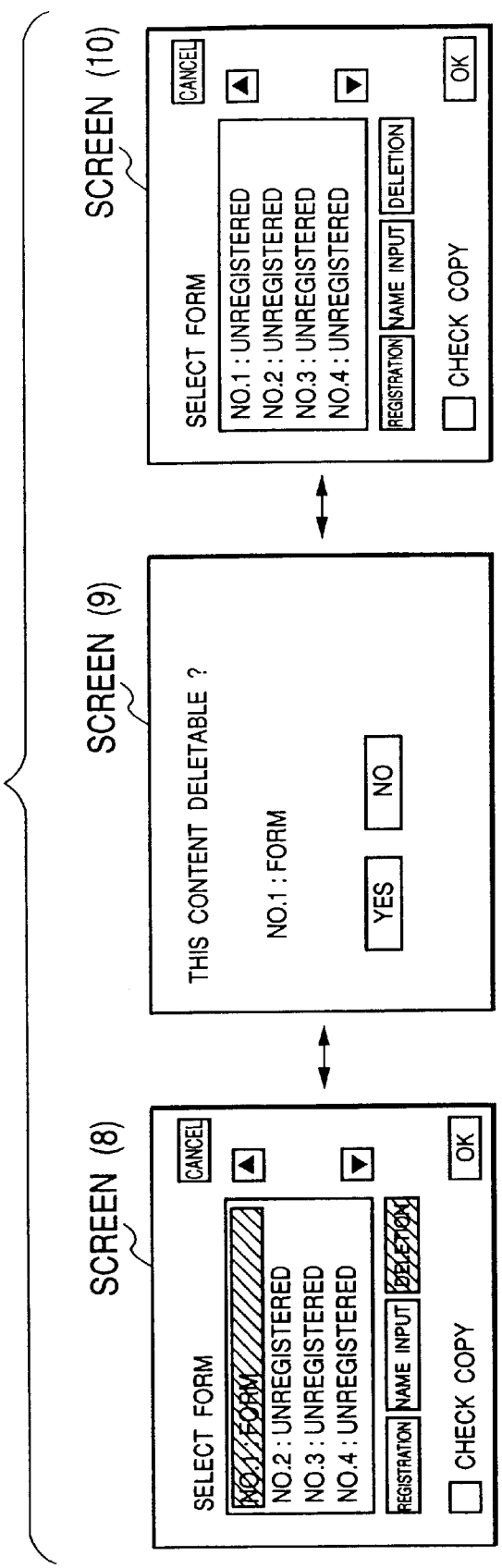
FIG. 11 is a view showing operations screens of the image formation apparatus 11 in a case where the form image is deleted.

FIGS. 9, 10 and 11 shows operation screens which are displayed on the operation unit 2000 of the image formation apparatus 11 and used for form image registration, name inputting and form image deletion. The screen includes a liquid crystal screen and a touch panel, and changed every time the touch panel is depressed.

FIG. 9 is the view showing the operation screens of the image formation apparatus 11 in the case where the form image is registered from the image readout apparatus 201.

Initially, the number at which the form is registered is designated on a screen (1). The message "UNREGISTERED" subsequent to the form number represents that a form is newly registered. If the user selects any form and then depresses the OK key on the screen (1), the screen (1) is changed into a screen (2) for selecting the original size. If the user selects any original size and then depresses the OK key on the screen (2), the screen (2) is changed into a screen (3).

The screen (3) displays the message to urge the user to set the original on which the image to be registered as the form image has been formed. If the user sets the original and then depresses the start key of the operation unit 2000, the image formation apparatus 11 starts the original readout process. After the original readout process ends, the screen (3) is changed into a screen (4). At the time when the screen (4) is displayed, the user can recognize that the registration of the form image ended. The screen (4) represents that the form image "SCAN 01" has been registered in correspondence with the form number "No. 1".

The form name representing the form input apparatus is automatically set immediately after the form image is registered. For example, in the case where the form image input apparatus is the original readout apparatus, the form name is displayed as "SCAN 01" or "SCAN 02". If necessary, the name is input to change the form name. The indication "CHECK COPY" on the screen (4) represents the function to print and check the image if the contents of the form image can not be discriminated only by its form name. If the user selects the desired form and then depresses the indication "CHECK COPY", it is possible to visibly confirm the registered form image.

FIG. 10 is the view showing the operation screens of the image formation apparatus 11 in the case where the name of the form image is input.

On a screen (5), the user depresses the NAME INPUT key to select the form to which the form name is intended to be input. In the drawing, the name "SCAN 01" at the number "No. 1" is selected. If the user depresses the OK key, the screen (5) is changed into a screen (6). On the screen (6), the name is input by inputting roman characters and depressing conversion keys. Then, if the user depresses the OK key, the screen (6) is changed into a screen (7). On the screen (7), the name "FORM" is displayed at the number "No. 1".

FIG. 11 is the view showing the operation screens of the image formation apparatus 11 in the case where the form image is deleted.

On a screen (8), the user depresses the DELETION key to select the form intended to be deleted. Then, if the user depresses the OK key, a screen (9) is displayed to confirm whether or not the selected form is really deletable. If the user depresses the key "NO", the screen (9) is returned to the screen (8) to again select the form. On the other hand, if the user depresses the key "YES" because the selected form number to be deleted is correct, the form is deleted, and then the screen (9) is changed into a screen (10). The deleted form has the initial name "UNREGISTERED".

Figure 12:
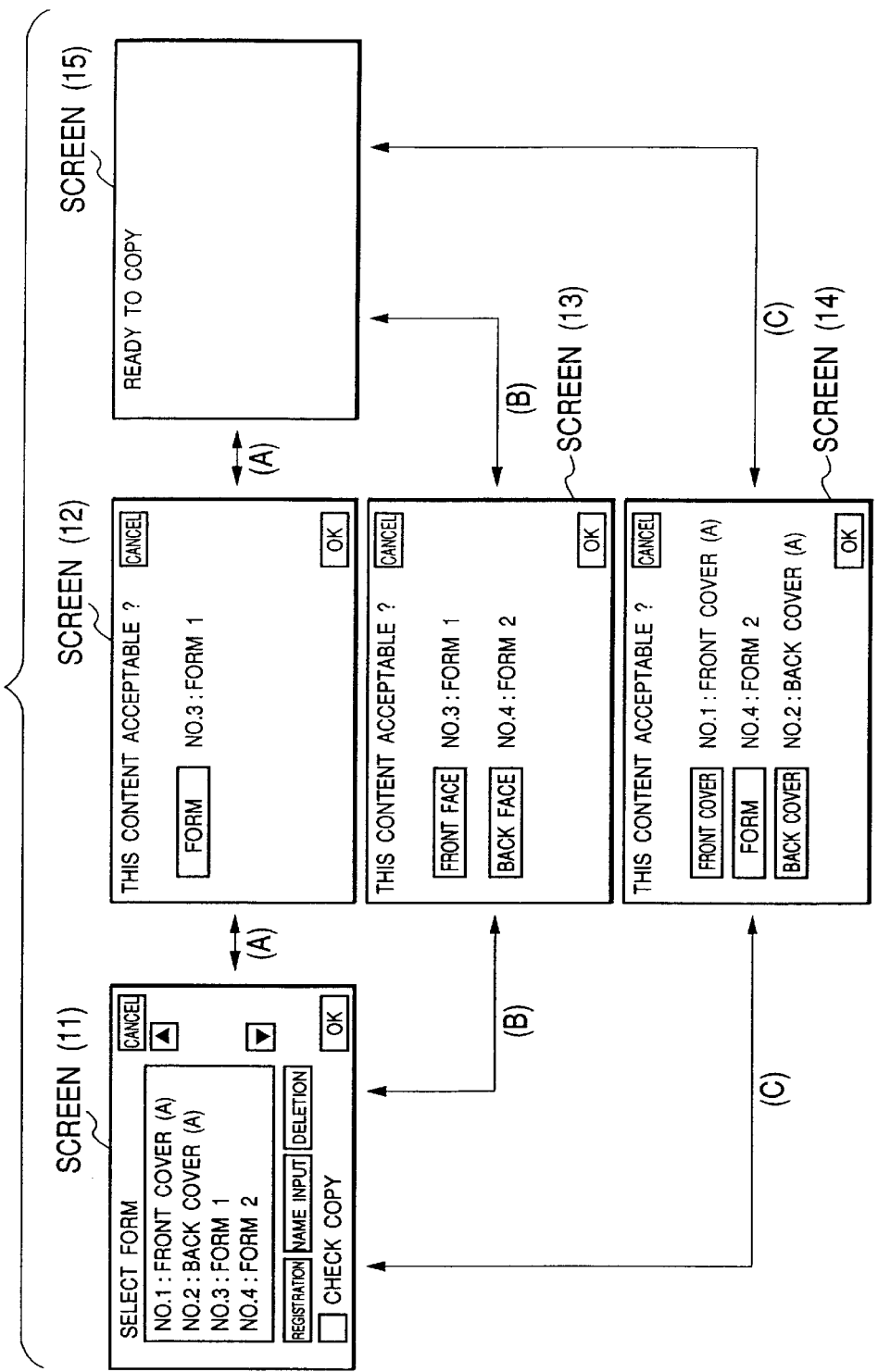
FIG. 12 is a view showing a form image designation method in the operation unit of the image formation apparatus.

FIG. 12 is the view showing the form image designation method in the operation unit of the image formation apparatus 11. In the present embodiment, in order to be able to conveniently select the screen for form designation, the operation screen is changed according to the set operation mode of the image formation apparatus. A screen (12) represents the operation screen in case of the mode that the single-face print is obtained from the single-face original, a screen (13) represents the operation screen in case of the mode that the double-face print is obtained from the single-face originals, and a screen (14) represents the operation screen in the case where the cover images are output onto the front and back covers in a cover mode and simultaneously the double-face printing is performed. As above, if the form synthesis is designated at the operation unit, the operation screens for form designation are changed and displayed according to the previously designated operation mode. Hereinafter, three kinds of operations shown on the screens (12), (13) and (14) will be explained by way of example.

The screen (12) is the screen in case of the ordinary single-face copying. That is, in the case where the mode (i.e., ordinary copying mode) that one single-face original is copied onto the single face of one sheet has been previously set, if the user selects any form image and depresses the OK key on a form image basic setting screen (11), the screen (12) is displayed. In the drawing, the screen (12) represents that the form image "FORM 1" at the form number "No. 3" is selected.

If the displayed form is acceptable for the user, he depresses the OK key, whereby the screen (12) is changed into a copying screen (15). On the other hand, if the user wishes to change the form, he depresses the FORM key. Thus, the screen (12) is returned to the screen (11), whereby the user can newly select the form number.

Figure 13:
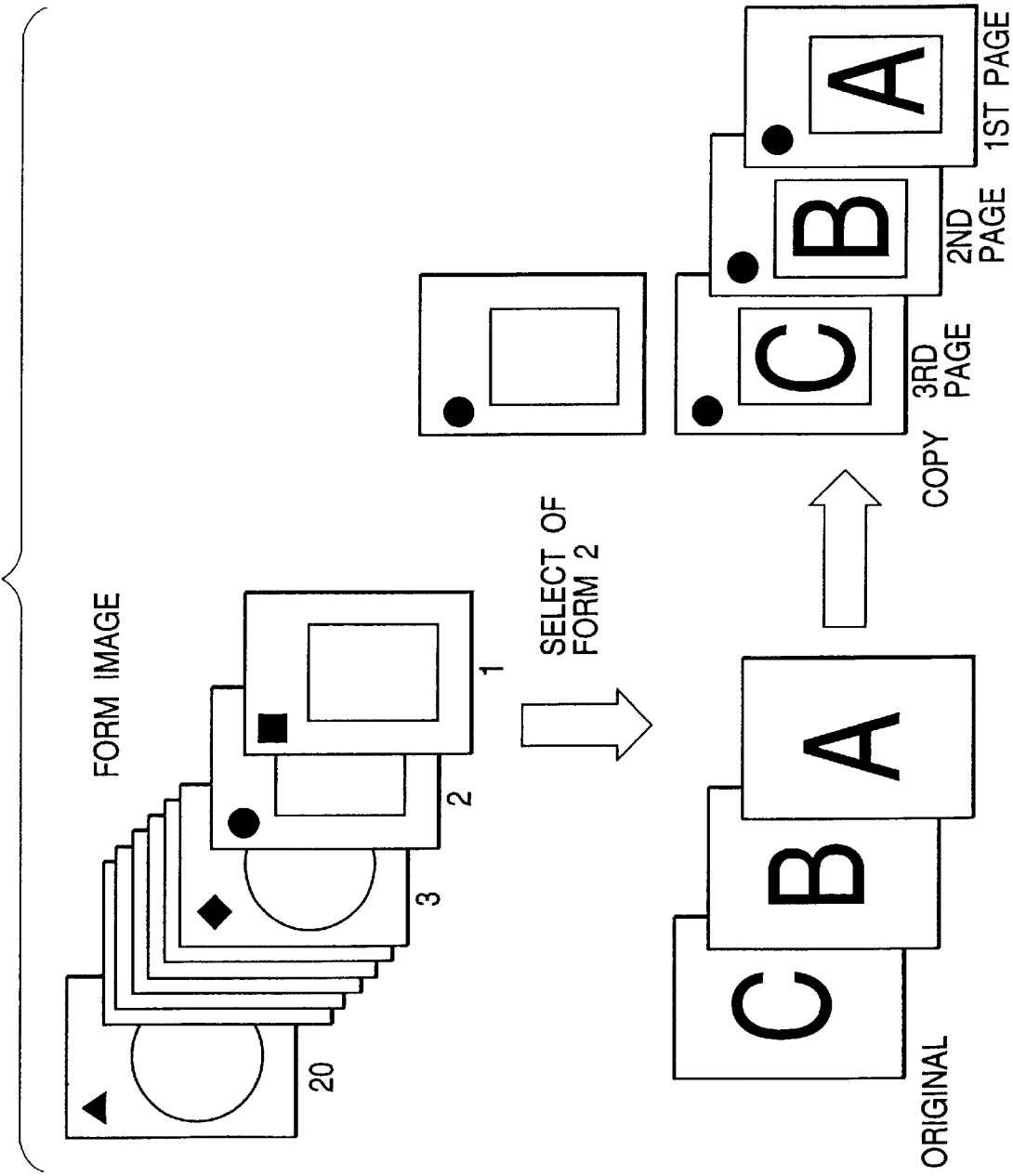
FIG. 13 is a view showing the relation of the form images, originals and copy images.

FIG. 13 is the view showing the relation of the form images, the originals and the copy images in the present embodiment. Hereinafter, by using an example that the image of FORM 2 is synthesized or composited in the single-face originals A, B and C to obtain the single-face copies, the above relation will be explained with reference to the timing chart shown in FIG. 14.

Figure 14:
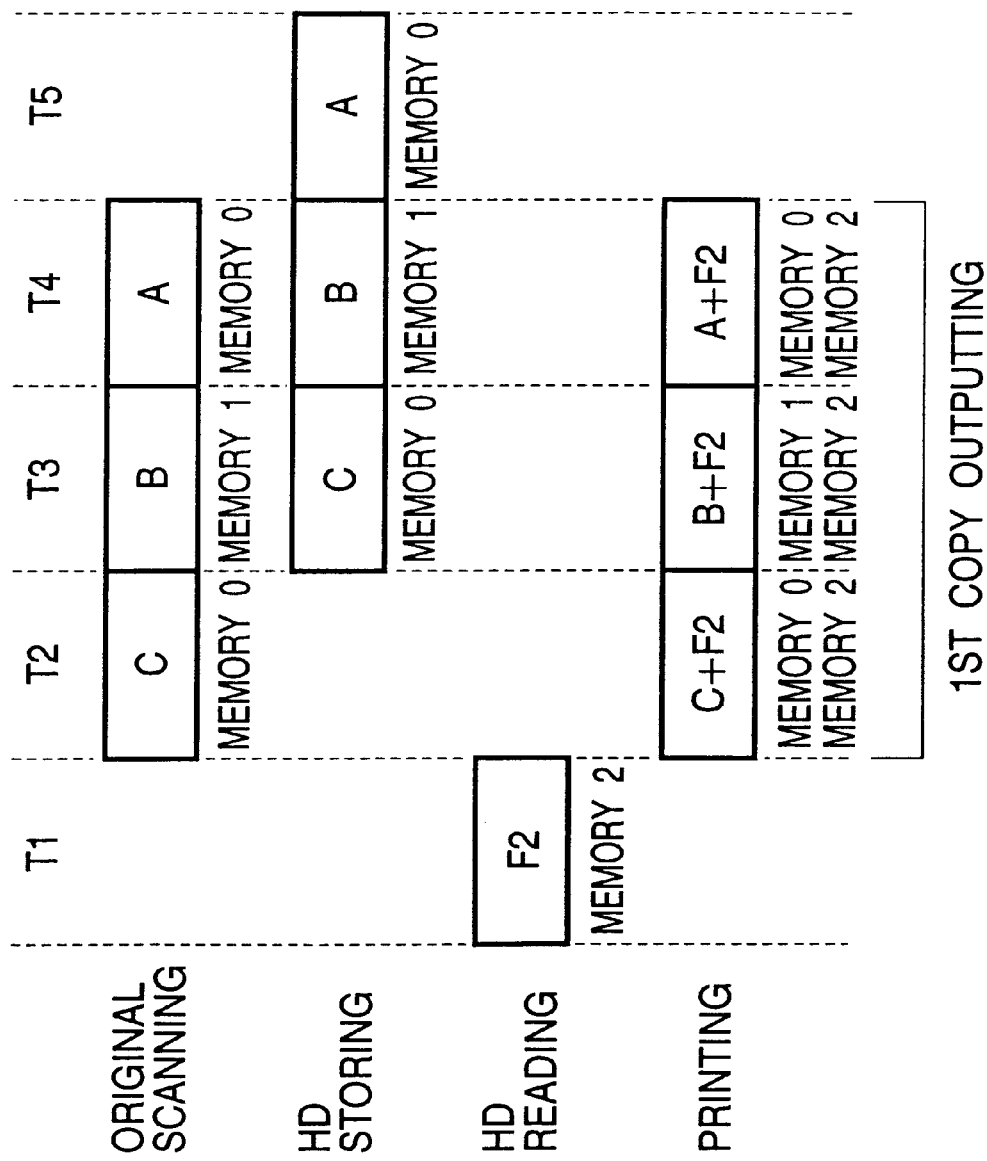
FIG. 14 is a view showing operation timing in the example shown in FIG. 13.

In FIG. 14, the axis of abscissa represents the time, and the axis of ordinate represents the respective processes. Thus, it is possible to easily know the processes to be performed in the respective times. It should be noted that such definitions are similarly applied to the timing charges shown in FIGS. 16 and 18. Further, as apparent from FIG. 14, in the present embodiment, in parallel with the original image synthesis, these images are also stored in the hard disk such that the second copies of these images can be later output.

Initially, at the timing of T1, the image of FORM 2 (F2) is read from the hard disk and written into the memory 2 of the layout memory 406. In this form synthesis operation, as shown in FIG. 5, in addition to the memories 0 and 1 into which the images are written in sequence, the memory 2 in which the form image is stored is used. That is, the total three memories are used for this form synthesis operation.

At the timing of T2, the original C is scanned and written into the memory 0. At substantially the same time, the data of the original C is read from the memory 0 and output as the image data (A) through the rotation process unit 407 and the parallel/serial conversion unit 408 in the memory control unit 303. In synchronism with this outputting, the image of FORM 2 previously written in the memory 2 is read and output as the image data (B) through the rotation process unit 409 and the parallel/serial conversion unit 410. The read image data (A) and (B) are synthesized in the later-stage image synthesis unit 306 in FIG. 4. The synthesized data which is represented as the data (C+F2) in FIG. 14 is printed at the timing of T2.

Subsequently, the synthesized data (B+F2) is printed at the timing of T3, and the synthesized data (A+F2) is printed at the timing of T4 in the similar manner. Thus, the outputting of the first copy ends.

Figure 15:
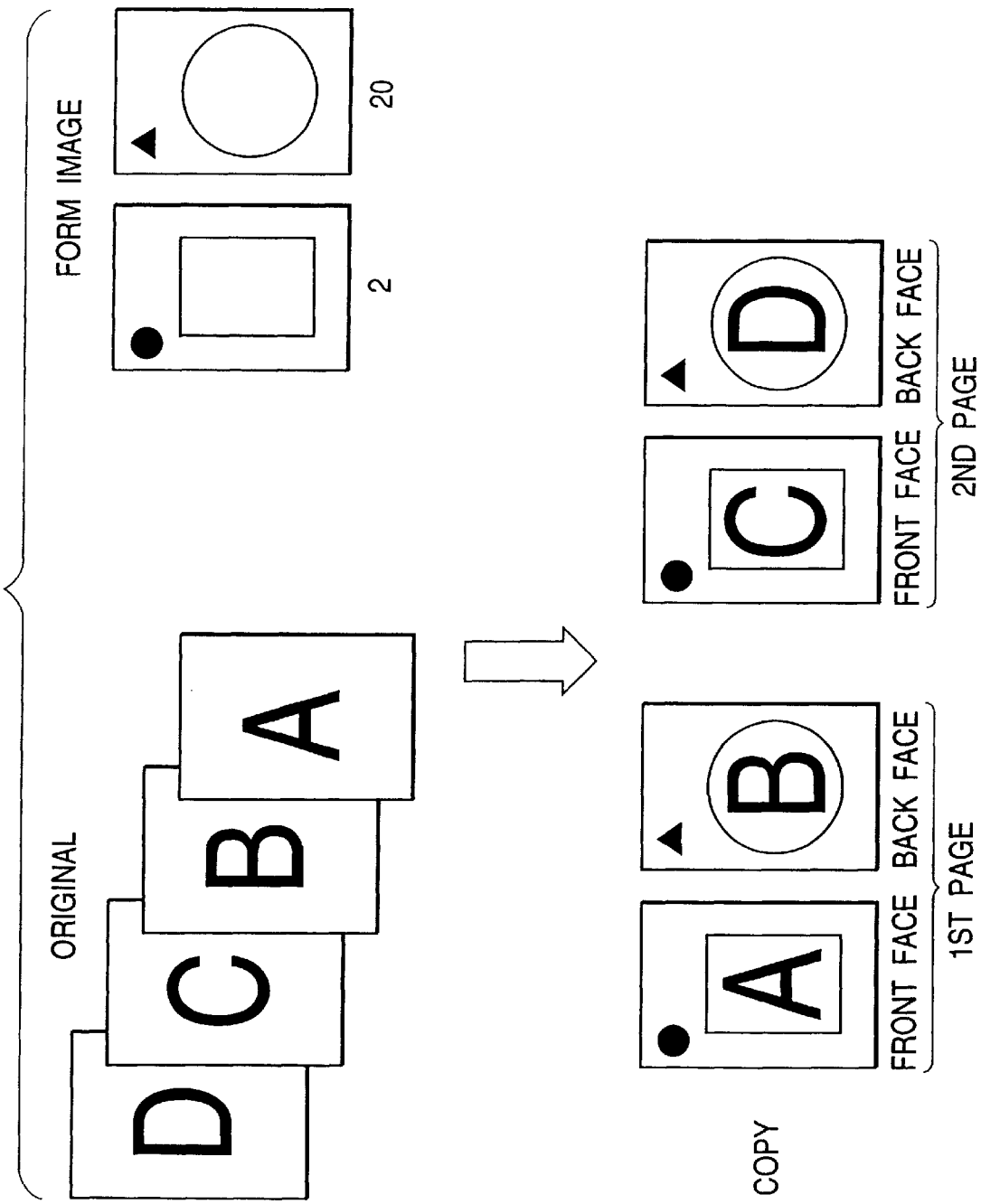
FIG. 15 is a view showing form image synthesis in a case where single-face originals are subjected to double-face (or two-face) copying.

FIG. 15 shows that, in a case where the single-face originals A, B, C and D are subjected to the double-face copying, the image of FORM 2 is synthesized to the image on each front face of the copies and the image of FORM 20 is synthesized to the image on each back face of the copies. The operation screen to designated the form in this case is the screen (13) shown in FIG. 12.

In the case where the mode (i.e., double-face copying mode) that the two single-face originals are copied onto both the faces of the single sheet has been previously set, if the user selects the form image for the front face of the sheet and the form image for the back face of the sheet and then depresses the OK key on the form image basic setting screen (11), the screen (13) is displayed. The screen (13) represents that the form image to be formed on the front face of the sheet is the form image named "FORM 1" and the form image to be formed on the back face of the sheet is the form image named "FORM 2". As above, in the case where the double-face printing mode is set as the operation mode of the image formation apparatus, when the form image is synthesized, the number of form images selectable by the user is set as "2" such that the user can select the form image for each of the front and back faces of the sheet. It should be noted that the identical form image may be selected for both the front and back faces of the sheet, or the form image may be selected for only one of the front and back faces of the sheet.

Figure 16:
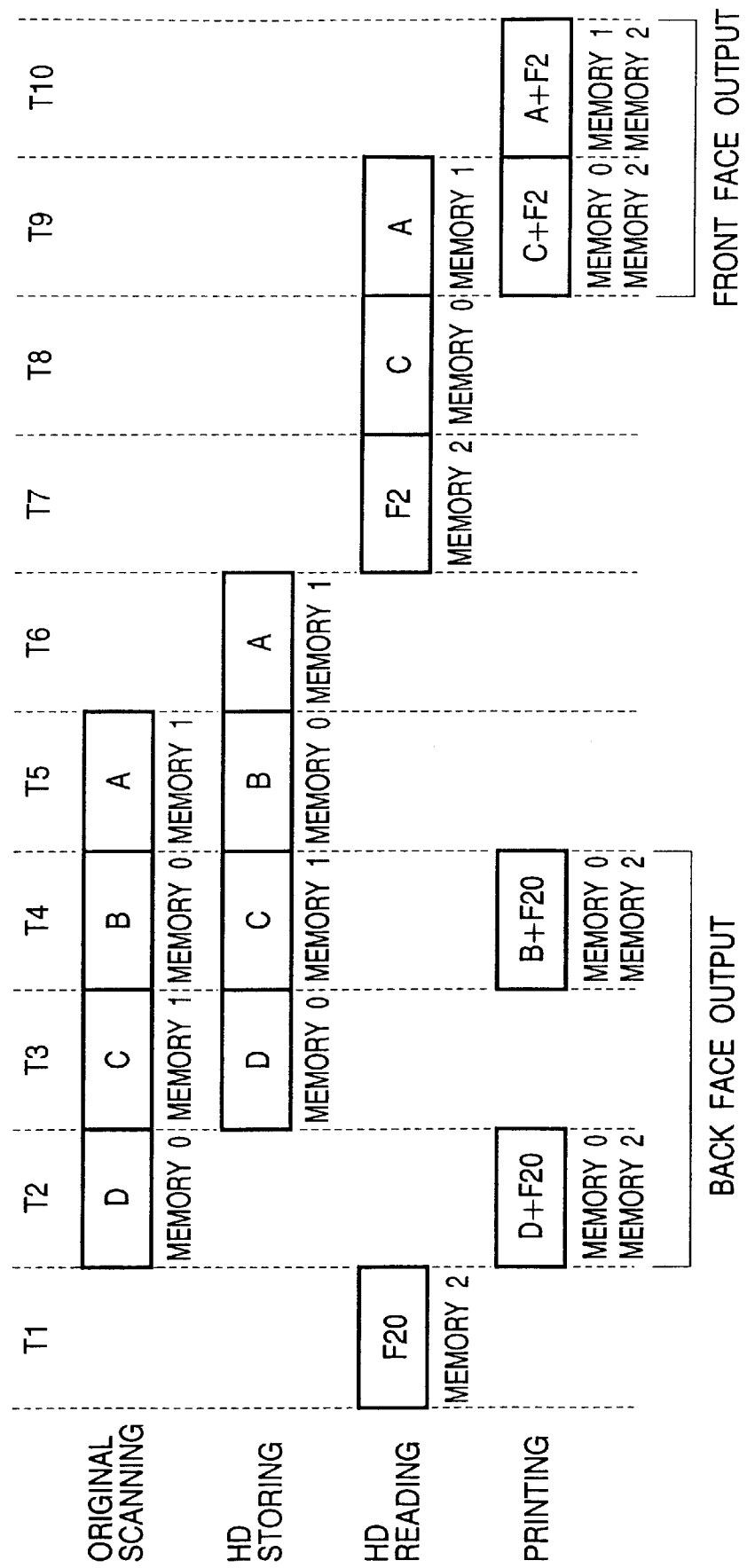
FIG. 16 is a view showing operation timing in the example shown in FIG. 15.

FIG. 16 shows the operation timing of the operation shown in FIG. 15. In this operation, the original output order is changed in the double-face copying, and the image to be copied is also stored in the hard disk such that the second copy can be later output.

Initially, at the timing of T1, the image of FORM 20 (F20) is read from the hard disk and written into the memory 2 in the layout memory 406. In this form synthesis operation, as shown in FIG. 5, in addition to the memories 0 and 1 into which the images are written in sequence, the memory 2 in which the form image is stored is used. That is, the total three memories are used for this form synthesis operation.

At the timing of T2, the original D is scanned and written into the memory 0. At substantially the same time, the data of the original D is read from the memory 0 and output as the image data (A) through the rotation process unit 407 and the parallel/serial conversion unit 408 in the memory control unit 303. In synchronism with this outputting, the image of FORM 2 previously written in the memory 2 is read and output as the image data (B) through the rotation process unit 409 and the parallel/serial conversion unit 410. The read image data (A) and (B) are synthesized in the later-stage image synthesis unit 306 in FIG. 4. The synthesized data represented as the data (D+F20) in FIG. 16 is printed at the timing of T2.

At the timing of T3, the original C is scanned and written into the memory 1. At substantially the same time, the data of the original D previously written into the memory 0 is read therefrom and stored in the hard disk.

At the timing of T4, the original B is scanned and written into the memory 0. At substantially the same time, the data of the original B is read from the memory 0 and subjected to the same process as above, whereby the image data (A) is output. In synchronism with this outputting, the image data (B) of the image of FORM 20 is output from the memory 2 and synthesized by the image synthesis unit 306. The synthesized data is represented as the data (B+F20) in FIG. 16. By the operation up to this time, the printing on the back face of the sheet in the double-face copying ends. After then, at the timing of T5 and T6, the image data of the originals B and A are stored in the hard disk in sequence.

Subsequently, at the first timing of T7 for performing the printing on the front face of the sheet, the image of FORM 2 to be synthesized on the front face is read from the hard disk and written into the memory 2. Then, at the timing of T8, T9 and T10, the image data for the front face (i.e., image data of originals C and A) are read from the hard disk in sequence and synthesized to the image of FORM 2 in the memory 2. After then, the synthesized data (C+F2) and (A+F2) are printed on the sheet in sequence to complete the double-face copying.

Figure 17:
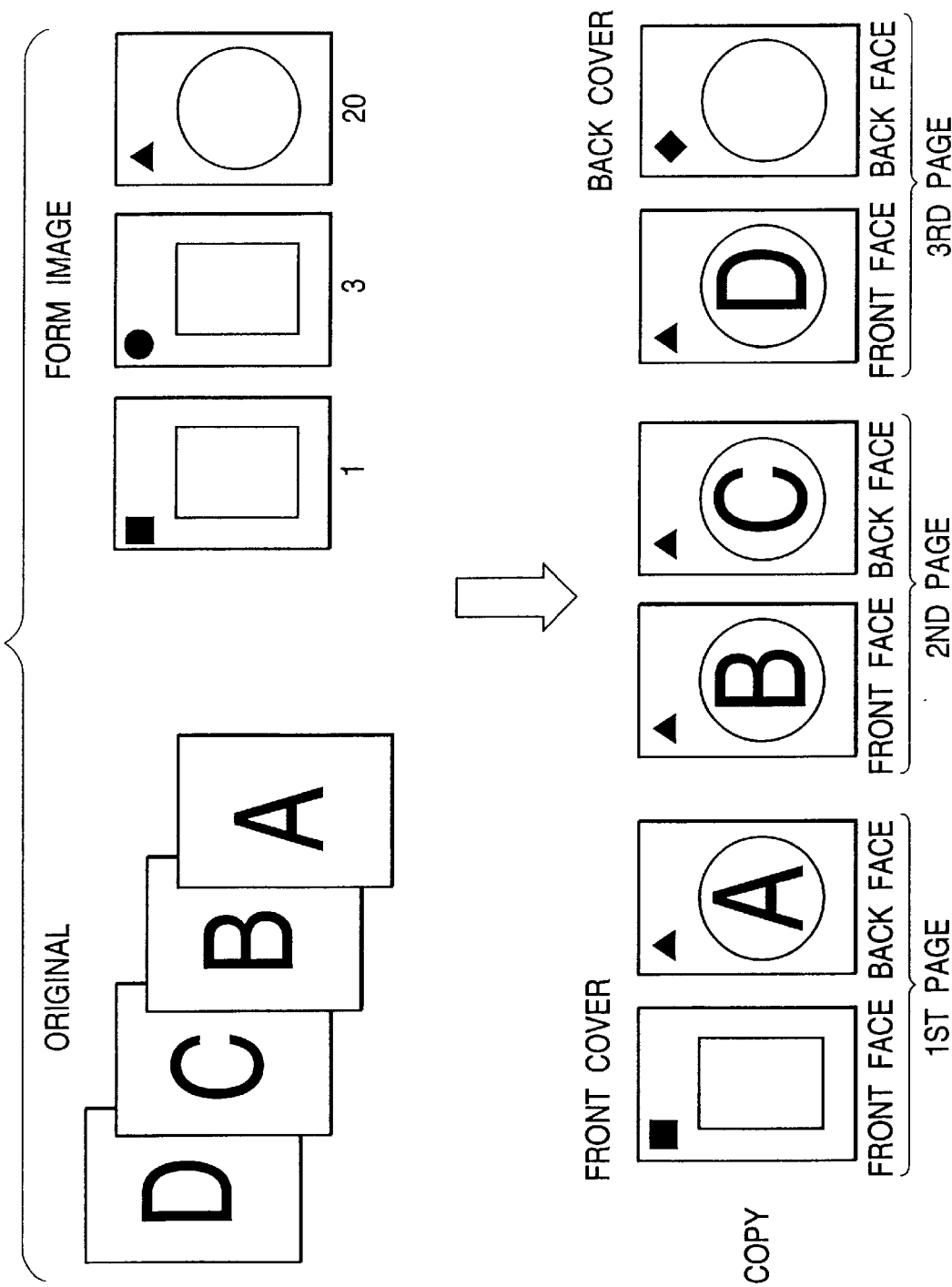
FIG. 17 is a view showing a case where the single-face originals are subjected to the double-face copying in a cover mode.

FIG. 17 shows a case where, when the single-face originals A, B, C and D are subjected to the double-face copying in the cover mode, the synthesis outputting is performed by using the form images. That is, in the example shown in FIG. 17, the designation is performed by the user on the screens (11) and (14) of the operation unit shown in FIG. 12 such that the form image FORM 20 is synthesized to the original image data (corresponding to four single-face originals), the form image FORM 1 is synthesized on the front cover, and the form image FORM 3 is synthesized on the back cover.

The operation screen to designated the form in this case is the screen (14) shown in FIG. 12.

In the case where the cover mode has been set as the operation mode of the image formation apparatus, if the user selects the predetermined form image and depresses the OK key on the form image basic setting screen (11), the screen (14) is displayed. The screen (14) represents that the form images for the text of the original, the front cover and the back cover have been selected respectively. As above, in the present embodiment, in the case where the cover mode is set as the operation mode of the image formation apparatus and the form image is used, the three form images are selectable by the user such that he can select the form image for each of the front cover, the text and the back cover.

The finished state in this job is shown at the lower part in FIG. 17. That is, the form image FORM 1 is formed as the image for the front cover on the front face of the first page of the output print consisting of three pages, the synthesis image of the original image A and the form image FORM 20 is formed on the back face of the first page, the synthesis image of the original image B and the form image FORM 20 is formed on the front face of the second page, the synthesis image of the original image C and the form image FORM 20 is formed on the back face of the second page, the synthesis image of the original image D and the form image FORM 20 is formed on the front face of the third page, and the form image FORM 3 is formed as the image for the back cover on the back face of the third page.

Figure 18:
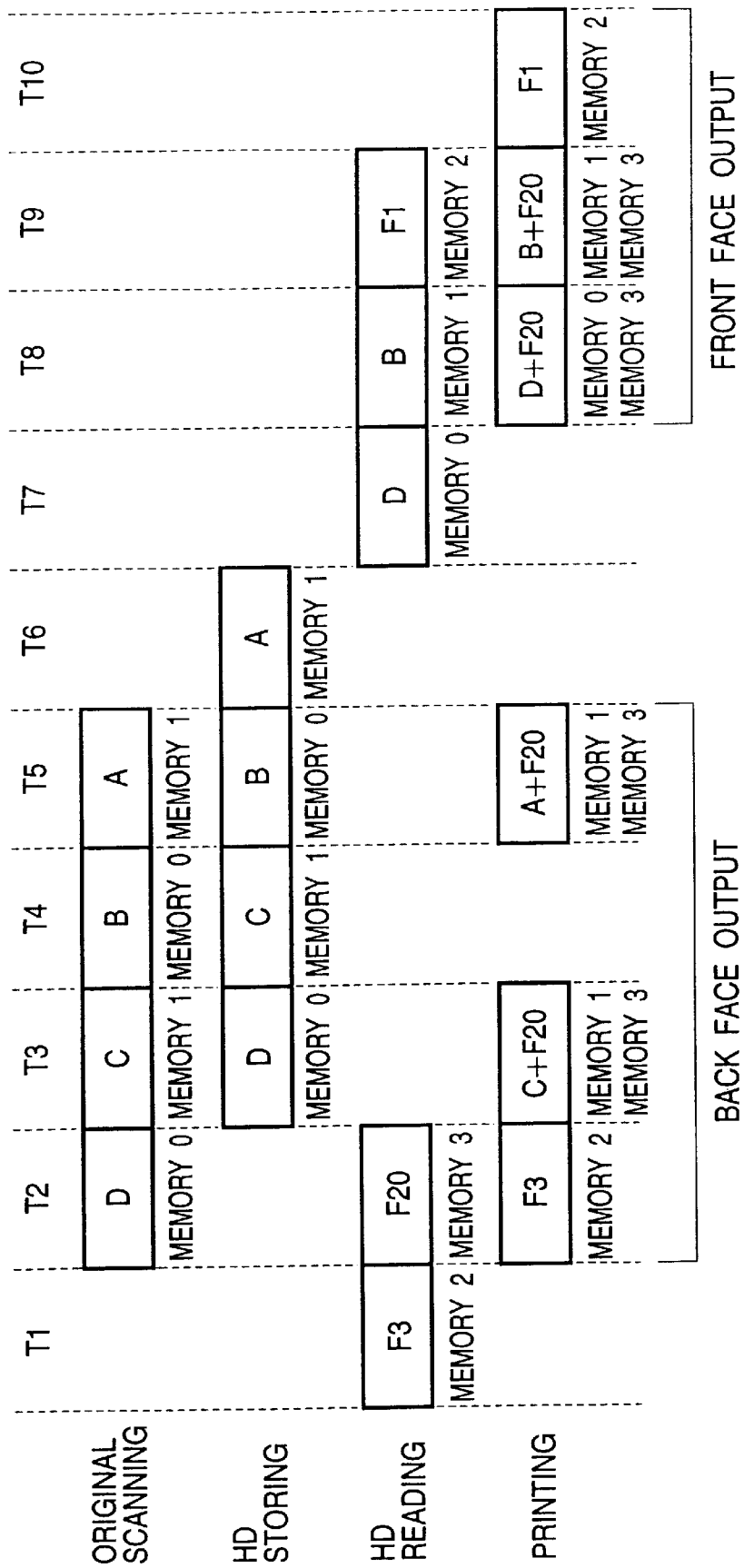
FIG. 18 is a view showing operation timing in the example shown in FIG. 17.

FIG. 18 shows the process timing in this job. In this process, the original output order is changed in the double-face copying of the cover sheet mode, and the image to be output is also stored in the hard disk such that the second copy can be later output.

Initially, at the timing of T1, the form image FORM 3 to be output for the back cover is read from the hard disk and stored in the memory 2. Then, at the timing of T2, the form image FORM 20 to be synthesized to the original image is read from the hard disk and stored in the memory 3. The form image FORM 1 to be output for the front cover is read from the hard disk and stored in the memory 2 at the timing of T9. In the present embodiment, since the total three kinds of form images are used and the double buffer system is used to read the original at high speed, the four kinds of memories 0 to 3 in the layout memory 406 (FIG. 5) are all used. Since other operations in FIG. 18 are the same as those already explained in FIG. 16, the explanation thereof is omitted.

As to the image formation order, the form image FORM 3 is formed as the image for the back cover on the back face of the sheet of the third page at the timing of T2, the synthesis image of the original image C and the form image FORM 20 is formed on the back face of the sheet of the second page at the timing of T3, the synthesis image of the original image A and the form image FORM 20 is formed on the back face of the sheet of the first page at the timing of T5, the synthesis image of the original image D and the form image FORM 20 is formed on the front face of the sheet of the third page at the timing of T8, the synthesis image of the original image B and the form image FORM 20 is formed on the front face of the sheet of the second page at the timing of T9, and the form image FORM 1 is formed as the image for the front cover on the front face of the sheet of the first page at the timing of T10. At the period T10, the printing of the first copy of the output data consisting of three-page double-face images ends.

Figure 20:
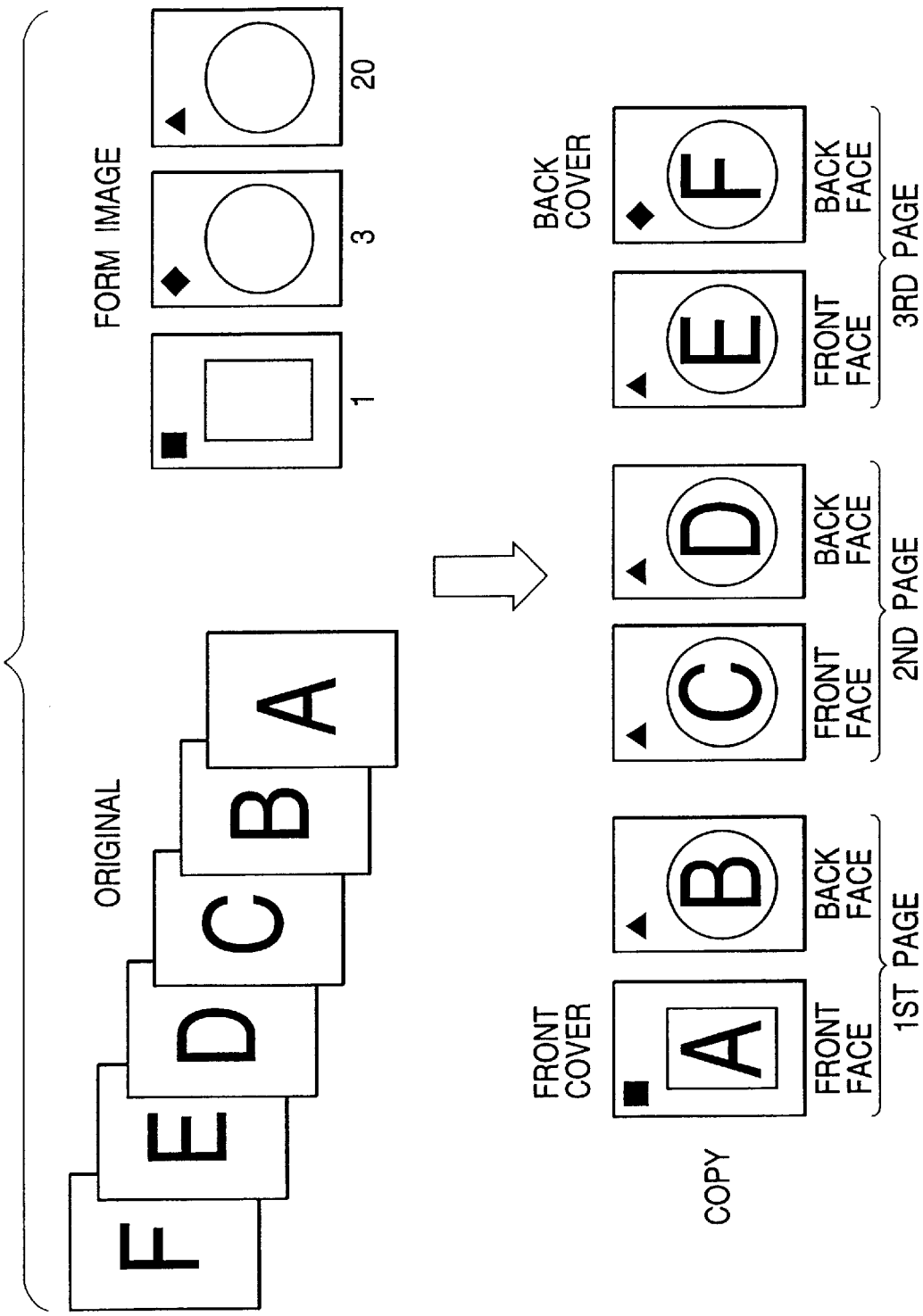
FIG. 20 is a view for explaining the relation of the form images, the originals and the output images in the cover mode.

As above, in the present embodiment, in the case where the cover mode has been set as the operation mode of the image formation apparatus, when the form image synthesis process is performed, the number of selectable form images is set to be three such that the user can select the form image for the text (original), the form image for the front cover and the form image for the back cover. As to the cover mode, the original image is not formed on the front and back covers in the example shown in FIG. 17. However, as shown in FIG. 20, it is possible to form the original images on the front and back covers. Thus, the user can select either one of the two kinds of cover modes, one being not to form the original image on the cover and the other being to form the original image on the cover. In the example shown in FIG. 20, the synthesis image of the original image A and the form image FORM 1 is formed on the front face of the sheet for the front cover, and the synthesis image of the original image F and the form image FORM 3 is formed on the back face of the sheet for the back cover.

In addition to the cover mode that the front and back covers mixedly exist, the present invention is applicable even to an operation mode (i.e., interleaf mode) that an interleaf is inserted as a partition between the successive sheets. The example of this case will be explained with reference to FIG. 21.

Figure 21:
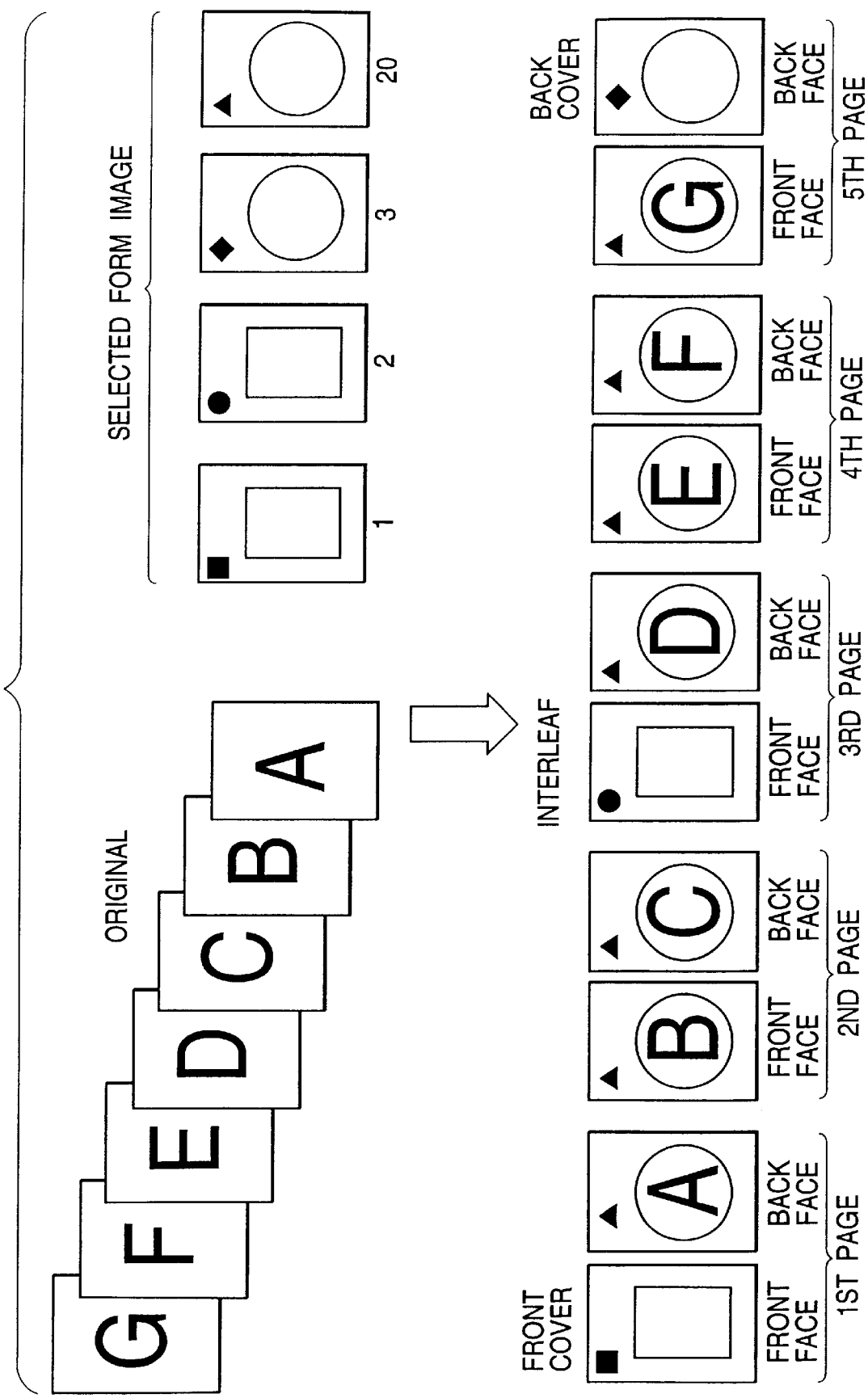
FIG. 21 is a view for explaining the relation of the form images, the originals and the output images in the cover and interleaf modes.

FIG. 21 shows the example that, in a case where the single-face originals A, B, C, D, E, F and G are subjected to the double-face copying in a cover and interleaf mode (i.e., cover mode+interleaf mode), the form images are used in the synthesis outputting. In this case, it is assumed that the user selects the form images and instructs the synthesis outputting on the screen of the control unit such that the form image FORM 20 is synthesized to the original image data (corresponding to seven single-face originals), the form image FORM 1 is used for the front cover, the form image FORM 2 is used for the interleaf, and the form image FORM 3 is used for the back cover. The image formation apparatus performs the synthesis process and the printing on the basis of the instruction issued from the user.

The finished state in this job is shown at the lower part in FIG. 21. That is, the form image FORM 1 is formed as the image for the front cover on the front face of the first page of the output print consisting of five pages, the synthesis image of the original image A and the form image FORM 20 is formed on the back face of the first page, the synthesis image of the original image B and the form image FORM 20 is formed on the front face of the second page, the synthesis image of the original image C and the form image FORM 20 is formed on the back face of the second page, the form image FORM 2 is formed as the interleaf on the front face of the third page, the synthesis image of the original image D and the form image FORM 20 is formed on the back face of the third page, the synthesis image of the original image E and the form image FORM 20 is formed on the front face of the fourth page, the synthesis image of the original image F and the form image FORM 20 is formed on the back face of the fourth page, the synthesis image of the original image G and the form image FORM 20 is formed on the front face of the fifth page, and the form image FORM 3 is formed as the image for the back cover on the back face of the fifth page.

The user can select the form image to be synthesized to the original image (i.e., image for text), and also select the form image for each of the specific sheets for the front cover, the interleaf and the back cover. FIG. 21 shows the example that one interleaf is inserted into the data including the front and back covers. However, for example, if another interleaf is inserted, the number of form images selectable by the user is increased by one.

As above, in the case where the modes (i.e., cover mode, interleaf mode, cover and interleaf mode and the like) that the images are formed on the ordinary sheet, the cover (including front and back covers) and the specific sheet for the interleaf different from the ordinary sheet and the formed images are mixedly output have been set as the operation modes of the image formation apparatus, it is possible to select the form image to be formed on the ordinary sheet, and also it is possible to select the form image for each specific sheet to be mixed into the ordinary sheet. That is, in this case, the number of form images selectable by the user is the number obtained by adding one to the number corresponding to the number of specific sheets to be mixed.

As explained above, in the present embodiment, the form image selection method is controlled to be different for each of the plural operation modes of the image formation apparatus, such as the ordinary printing mode, the double-face printing mode, the cover mode and the like. Further, the number of form images selectable by the user is determined according to the set operation mode. Also, as explained in FIG. 12, the form image selection screen is controlled to be different for each of the plural operation modes.

Subsequently, a case where the image data produced at the computer 12 or 13 being the data source different from the image readout unit 201 is registered as the form image in the hard disk of the image formation apparatus 11 will be explained. Screens (16), (17-1), (17-2) and (17-3) shown in FIG. 19 are the screens displayed on the display unit of the computer, whereby certain operations are possible on these screens by a keyboard, a mouse and the like installed in the computer.

Figure 19:
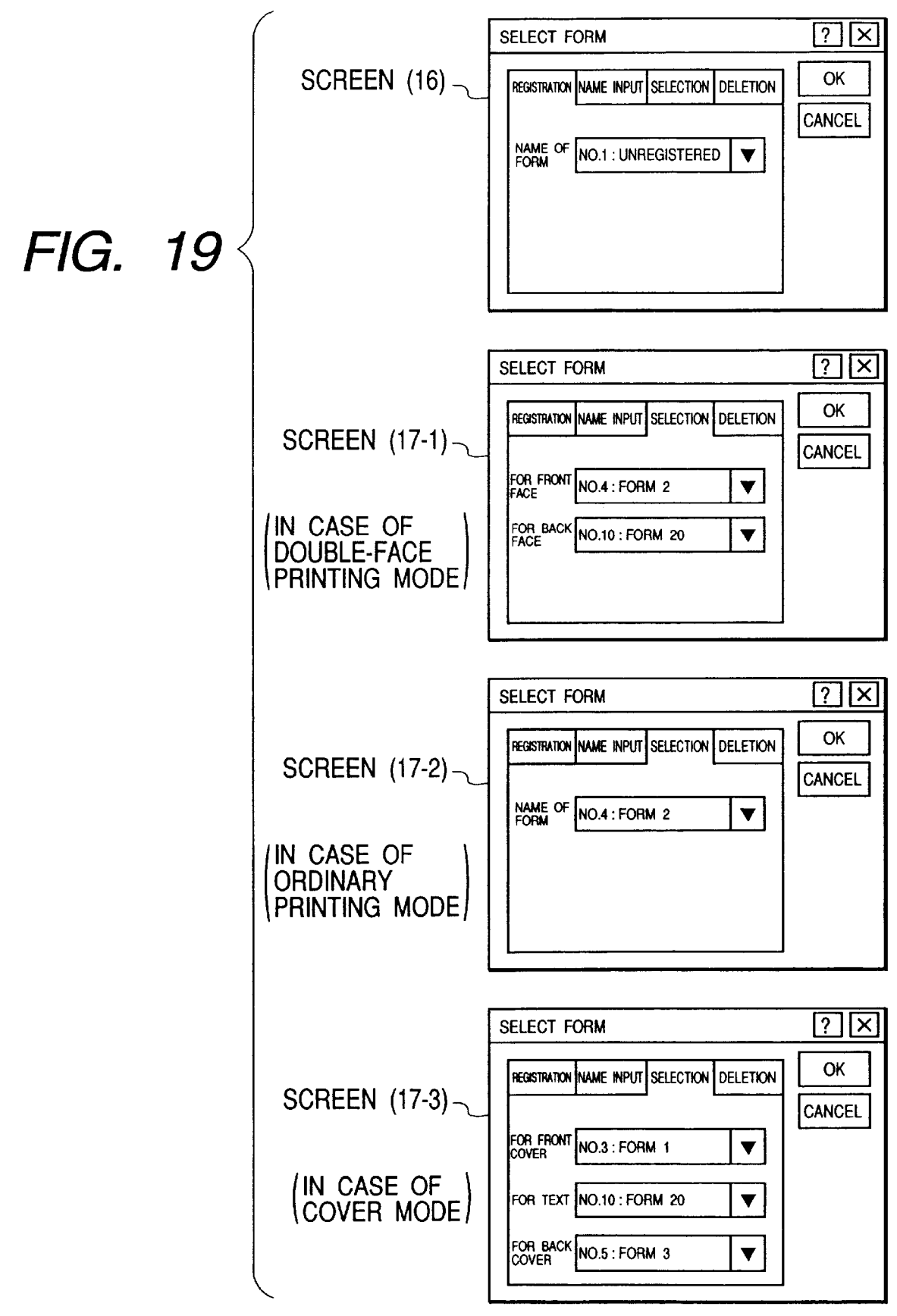

In FIG. 19, the screen (16) is the form selection menu screen used in a case where any of registration, name inputting, selection and deletion of the form image is performed. Initially, the user produces the form image by using the application software on the computer, and then opens the form selection menu screen (16) to select the REGISTRATION key. If the user scrolls the screen to select the form name intended to be registered and then depresses the OK key, the image corresponding to the selected name is registered as the form image in the image formation apparatus 11. Basically, the name produced by the application software is used as the form name (or file name) at this time. If the user wishes to change the name, he can do it by selecting the NAME INPUT key and inputting the new name.

The screen (17-1) is the form image selection screen displayed in a case where the double-face printing mode has been previously set by a printer driver. On this screen, the form image is independently selectable for each of the front and back faces of the sheet for convenience in operation. If the user selects the OK key, the form image is selected, and the form synthesis process is automatically performed in the printing. Similarly, even in the mode other than the double-face printing mode, the optimum selection screen is displayed on the display unit of the computer in accordance with the operation mode. For example, the screen (17-2) is the screen displayed in a case where the previously set operation mode is the ordinary printing mode. On this screen, the user can select one form image to be synthesized. On the other hand, the screen (17-3) is the screen displayed in a case where the previously set operation mode is the cover mode. On this screen, the user can select the form images respectively for the front cover, the text and the back cover. As above, the selection screen of the form image is set to be different for each of the plural operation modes. The selection screens such as the screens (17-1), (17-2) and (17-3) may be displayed on the operation unit 2000 even in a case where the operation is performed at the image formation apparatus.

As above, in the present embodiment, the plural form images are previously registered into the hard disk of the image storage unit 305 according to the instruction from the image readout apparatus by the operation at the operation unit 2000 of the image formation apparatus or from the computer 12 or 13 through the data expansion process unit 209, whereby it is possible to read the arbitrary form image for each page from the hard disk on the basis of the instruction from the operation unit 2000 or the computer, thereby realizing the electronic sort function and the form synthesis function in which working efficiency has been improved. Further, as explained in FIGS. 12 and 19, the selection method of the form image is set to be different for each of the plural operation modes of the image formation apparatus, whereby it is possible to easily select the optimum form image. Thus, it is possible to improve operational facility for the user.

Figure 22:
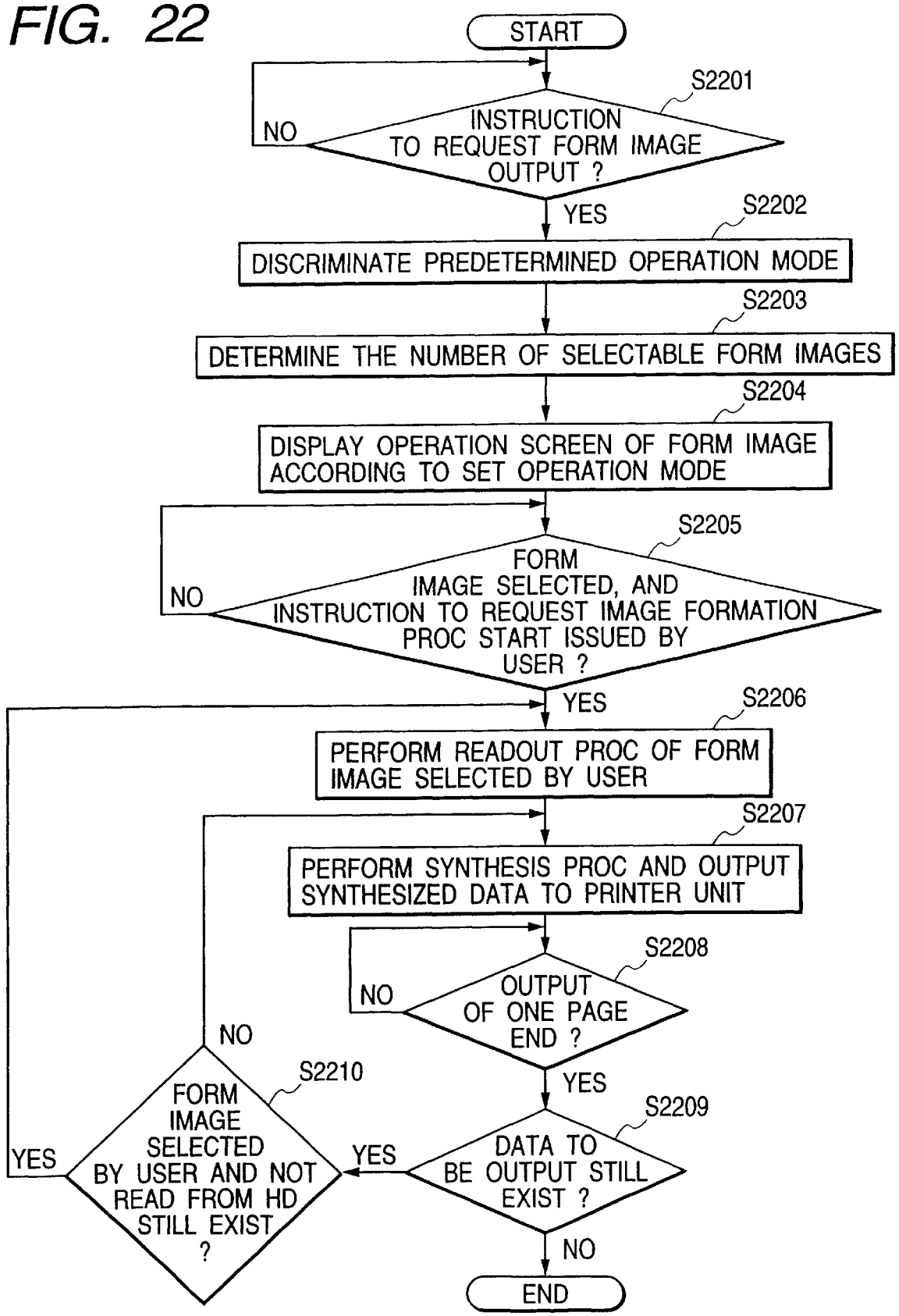
FIG. 22 is a flow chart showing the process in a case where an image formation process is performed by using the form images.

FIG. 22 is a flow chart showing the process in a case where an image formation process is performed by using the form images stored in the hard disk. The program for this process has been stored in the ROM 207 of the CPU circuit unit 205 in the form of codes, whereby these codes are read and executed by the CPU 206. It should be noted that this process is performed when the user handles the operation unit 2000 of the image formation apparatus or the computer 12 or 13.

Initially, it is judged whether or not the instruction to request the outputting of the form image is sent from the operation unit 2000 or the computer 12 or 13 (step S2201).

For example, if the user handles the touch panel on the operation unit 2000, this instruction is issued.

If judged in the step S2201 that the instruction to request the outputting of the form image is sent, then the previously set operation mode is discriminated (step S2202), and the number of selectable form images in such a job is determined according to the set operation mode (step S2203).

For example, the number of selectable form images is set to be one when the operation mode set for the image formation apparatus is the ordinary copying mode, the number of selectable form images is set to be two when the operation mode is the double-face copying mode, and the number of selectable form images is set to be three when the operation mode is the cover mode.

Subsequent to the step S2203, the operation screen of the form image according to the set operation mode is displayed (step S2204). It should be noted that the process in the step S2204 is performed to the source from which the instruction to request the outputting of the form image was sent.

As explained in FIG. 12, e.g., the screen (12) is displayed on the touch panel of the operation unit 2000 when the operation mode previously set at the operation unit 2000 is the ordinary copying mode, the screen (13) is displayed when the operation mode is the double-face copying mode, and the screen (14) is displayed when the operation mode is the cover mode. Further, as explained in FIG. 19, e.g., the screen (17-1) is displayed on the display unit of the computer when the operation mode previously set from the computer side is the double-face printing mode, the screen (17-2) is displayed when the operation mode is the ordinary printing mode, and the screen (17-3) is displayed when the operation mode is the cover mode. As above, the displayed contents are set to be different for each of the plural operation modes, thereby setting the form image selection method to be different for each mode.

Subsequently, it is judged whether or not the form image is selected by the user and the instruction to request the start of the image formation process is issued (step S2205). This process is repeated until such the instruction is issued.

If judged in the step S2205 that the instruction to request the start of the image formation process is issued, then the form image selected by the user is read from the form area in the hard disk of the image storage unit 305, and the read image is stored in the predetermined memory in the layout memory 406 (step S2206). Then the read form image and the image data input from the data source (e.g., image readout unit 201 or computer) are synthesized, and the synthesized data is output to the printer unit 204 (step S2207).

In the case where only the form image is formed on the sheet (e.g., in case of forming form image on front face of first page or back face of third page of output data; FIG. 17), or in a case where it is instructed by the user to form only the original image, the synthesis process is not performed in the step S2207, and instead the data is output to the printer unit 204 as it is. Further, in the step S2206, the form image read from the hard disk into the layout memory 406 is not deleted until the job in question ends. Therefore, if the form image used plural times in one job is read from the hard disk once, there is no need to again and repeatedly read it from the hard disk.

Subsequent to the step S2207, it is judged whether or not the image formation process of one page (corresponding to single face of sheet) is completed by the printer unit 204 (step S2208). The process in the step S2208 is repeated until the image formation process of one page is completed. If judged in the step S2208 that the image formation process of one page is completed, then it is judged whether or not the data to be output in this job still exists (step S2209).

If judged in the step S2209 that the data to be output does not exist, then the process ends. On the other hand, if judged that the data to be output still exists, then it is judged whether or not the form image not yet read from the hard disk exists in the form images selected by the user (step S2210). If judged in the step S2210 that the data not yet read exists, the flow returns to the step S2206. On the other hand, if judged that the form image not yet read does not exist in the form images selected by the user, the flow returns to the step S2207.

The present invention is not limited to the above embodiment shown in the annexed drawings, but can include, e.g., following various modifications.

(1) The object of the present invention can be achieved in a case where a storage medium storing therein program codes of software to realize the functions of the above embodiment (e.g., process for making form image operation screen different for each of plural operation modes to make form image selection method different for each mode, process for determining the number of selectable form images, process for executing operations explained in FIGS. 9 to 21, process shown in flow chart of FIG. 22, and the like) is supplied to a system or an apparatus, and thus a computer (or CPU or MPU) in the system or the apparatus reads and executes the program codes stored in the medium. In this case, the program codes themselves read from the storage medium realize the functions of the above embodiment, whereby the storage medium storing these program codes constitutes the present invention. As the storage medium from which the program codes are supplied, e.g., a floppy disk, a hard disk, an optical disk, a magnetooptical disk, a CD-ROM, a CD-R, a magnetic tape, a non-volatile memory card, a ROM or the like can be used.

(2) Further, it can be obviously understood that the present invention includes not only a case where the functions of the above embodiment are realized by executing the program codes read by the computer, but also a case where an OS (operating system) or the like running on the computer performs a part or all of the actual processes on the basis of instructions of the program codes and thus the functions of the above embodiment are realized by such the processes.

(3) Further, it can be obviously understood that the present invention also includes a case where, after the program codes read from the storage medium are written into a function expansion board inserted in the computer or a memory in a function expansion unit connected to the computer, a CPU or the like provided in the function expansion board or the function expansion unit performs a part or all of the actual processes on the basis of the instructions of the program codes, and the functions of the above embodiment are realized by such the processes.

(4) In the above embodiment, the case of automatically displaying the screen by which the optimum operation can be performed according to the operation mode has been explained. However, such a combination of the displayed screens may be freely selected by a manager or a service engineer. He can do so also in a case where, e.g., he intends to make the form image to be synthesized to an odd page different from the form image to be synthesized to an even page when the single-face copy is produced from the single-face original.

As described above in detail, according to the present embodiment, in the case where the different form image is synthesized to each page, it is possible to remarkably improve operation efficiency and also to quickly output the image in which the form image has been synthesized.

Further, the form image to be synthesized is designated for each page in accordance with the form designation operation from the operation unit 2000 or the instruction from the computer, whereby it is possible to easily select the optimum form image by, e.g., changing the form image selection method for each image formation operation mode.

What is claimed is:

1. An image processing apparatus for processing a job that includes a series of image data input from an image generation source and outputs the processed data to an image formation apparatus which can selectively perform one of a plurality of operation modes for the job, said image processing apparatus comprising:

setting means for setting one of the plurality of operation modes for the job;

storage means for storing form image data for a plurality of forms in a storage area;

selection means for enabling selection of one or more of the plurality of forms to be used in the job from the form image data stored in the storage area;

synthesis output means for performing a synthesis process for the one or more forms selected for the job by said selection means and the image data of the job input from the image generation source, and outputting the data subjected to the synthesis process to the image formation apparatus; and control means for controlling said selection means so as to change a number of candidates of forms selectable for the job by said selection means in accordance with the operation mode set for the job by said setting means.

2. An image processing apparatus according to claim 1, wherein said setting means sets any of the plurality of operation modes, and said control means controls said selection means to change the number of candidates of forms selectable by said selection means in each of the plurality of operation modes.

3. An image processing apparatus according to claim 2, wherein the plurality of operation modes includes a first operation mode to form an image on one face of a sheet and a second operation mode to form images on two faces of the sheet, on the basis of the image data input from said image generation source, and wherein said control means controls said selection means to set the number of candidates of forms selectable by said selection means to be one when the first operation mode is set by said setting means, and to set the number of candidates of forms selectable by said selection means to be two when the second operation mode is set by said setting means.

4. An image processing apparatus according to claim 3, wherein the plurality of operation modes further includes a third operation mode to form images on ordinary sheets, a front cover sheet for a front cover and a back cover sheet for a back cover and to mix the image-formed ordinary, front cover and back cover sheets with others, and wherein said control means controls said selection means such that the number of candidates of forms selectable by said selection means is set to be three when the third operation mode is set by said setting means.

5. An image processing apparatus according to claim 2, wherein the plurality of operation modes includes a first operation mode to form an image on one face of a sheet, a second operation mode to form images on two faces of the sheet, and a third operation mode to form images on plain sheets and non-plain sheets and to mix the image-formed plain and non-plain sheets with others, on the basis of the image data input from the image generation source, and wherein said control means controls said selection means such that the number of candidates of forms selectable by said selection means is set to be one when the first operation mode is set by said setting means, the number of candidates of forms selectable by said selection means is set to be two when the second operation mode is set, and the number of candidates of forms selectable by said selection means is set to be the number obtained by adding one to the number corresponding to the number of non-plain sheets to be mixed with the plain sheets when the third operation mode is set.

6. An image processing apparatus according to claim 2, wherein the plurality of operation modes includes a first operation mode to form the image on two faces of a sheet, and a second operation mode to form the images on plain sheets and non-plain sheets and to mix the image-formed plain and non-plain sheets with others, and wherein the image data formed on the first face of the sheet and stored in the storage area is different from the image data formed on the second face of the sheet and stored in the storage area when the first operation mode is set by said setting means, and the image data formed on the plain sheet and stored in the storage area is different from the image data formed on the non-plain sheet and stored in the storage area when the second operation mode is set.

7. An image processing apparatus according to claim 6, wherein the second operation mode is to mix image-formed plain sheet and plural non-plain sheets with others and to set the image data stored in the storage area selectable for each of the plural non-plain sheets.

8. An image processing apparatus according to claim 6, wherein the non-plain sheet is a sheet for the cover.

9. An image processing apparatus according to claim 6, wherein the non-plain sheet is an interleaf to be inserted between successive plain sheets.

10. An image processing apparatus according to claim 2, further comprising display means for displaying information concerning the form image data for the plurality of forms stored in the storage area, and wherein said selection means enables selection of any of the plurality of forms from among the form image data stored in the storage area, on the basis of the information displayed by said display means, and wherein said control means sets the displayed contents of said display means to be different for each of the plurality of operation modes.

11. An image processing apparatus according to claim 1, wherein the image generation source is an image readout apparatus or a host computer for reading an original image.

12. An image processing apparatus for processing a job that includes a series of image data input from an image generation source and outputs the processed data to an image formation apparatus which can selectively perform one of a plurality of operation modes for the job, said image processing apparatus comprising:

storage means for storing image data to be synthesized to the image data input from the image generation source, in a storage area;

selection means for selecting image data from the image data stored in the storage area;

synthesis output means for performing a synthesis process for the image data selected by said selection means and the image data input from the image generation source, and outputting the data subjected to the synthesis process to the image formation apparatus; and control means for performing controlling to set a selection method of said selection means to be different for each of the plurality of operation modes included in the image formation apparatus.

13. An image processing apparatus according to claim 12, further comprising display means for displaying information concerning the image data stored in the storage area, and wherein said selection means selects any of the image data from the image data stored in the storage area, on the basis of the information displayed by said display means, and wherein said control means sets the displayed contents of said display means to be different for each of the plurality of operation modes.

14. An image processing apparatus according to claim 12, wherein said control means determines the number of image data selectable by said selection means for each of the plurality of operation modes.

15. An image processing apparatus according to claim 14, wherein the plurality of operation modes includes a first operation mode to form the image on one face of a sheet, a second operation mode to form the images on two faces of the sheet, and a third operation mode to form the images on plain sheets and non-plain sheets and to mix the image-formed plain and non-plain sheets with others, on the basis of the image data input from the image generation source, and wherein said control means performs controlling such that the number of image data selectable by said selection means is set to be one when the first operation mode is set by said setting means, the number of image data selectable by said selection means is set to be two when the second operation mode is set, and the number of image data selectable by said selection means is set to be the number obtained by adding one to the number corresponding to a number of non-plain sheets to be mixed with the plain sheets when the third operation mode is set.

16. An image processing apparatus for performing an image process to image data input from an image generation source and outputting the processed image data to an image formation apparatus for forming an image on a sheet on the basis of the image data and an operation mode, said image processing apparatus comprising:

storage means for storing image data to be synthesized to the image data input from the image generation source, in a storage area;

selection means for selecting image data from the image data stored in the storage area; and synthesis output means for performing a synthesis process for the image data selected by said selection means and the image data input from the image generation source, and outputting the data subjected to the synthesis process to the image formation apparatus, wherein, in a case where the operation mode of said image formation apparatus is a mode to form images on plain sheets and non-plain sheets and to mix the image-formed plain and non-plain sheets with others, the maximum number of image data selectable by said selection means is set to be the number obtained by adding one to the number corresponding to a number of non-plain sheets to be mixed with the plain sheets.

17. An image processing apparatus according to claim 16, wherein the non-plain sheets are cover sheets, and the cover sheets include a front cover sheet and a back cover sheet.

18. An image processing apparatus according to claim 16, wherein the non-plain sheet is an interleaf to be inserted between successive plain sheets.

19. An image processing apparatus for performing an image process to image data input from an image generation source and outputting the processed image data to an image formation apparatus for forming an image on a sheet on the basis of the image data and an operation mode, said image processing apparatus comprising:

setting means for setting the operation mode of the image formation apparatus;

storage means for storing image data to be synthesized to image data input from the image generation source, in a storage area;

selection means for selecting image data from the image data stored in the storage area; and synthesis output means for performing a synthesis process for the image data selected by said selection means and the image data input from the image generation source, and outputting the data subjected to the synthesis process to the image formation apparatus, wherein, when the operation mode set by said setting means is a mode to form images on two faces of a sheet, said selection means can independently select the image data to be formed on a first face of the sheet and the image data to be formed on a second face of the sheet, and when the operation mode is a mode to form images on plain sheets and non-plain sheets and to mix the image-formed plain and non-plain sheets with others, said selection means can independently select the image data to be formed on the plain sheet and the image data to be formed on the non-plain sheet.

20. An image processing method for processing a job that includes a series of image data input from an image generation source and outputting the processed data to an image formation apparatus which can selectively perform one of a plurality of operation modes for the job, said method comprising:

a setting step of setting one of the plurality of operation modes for the job;

a storage step of storing form image data for a plurality of forms in a storage area;

a selection step of enabling selection of one or more forms to be used in the job from the form image data stored in the storage area;

a synthesis output step of performing a synthesis process for the one or more forms selected for the job in said selection step and the image data of the job input from the image generation source, and outputting the data subjected to the synthesis process to the image formation apparatus; and a control step of controlling a number of candidates of forms selectable for the job in said selection step in accordance with the operation mode set for the job in said setting step.

21. An image processing method according to claim 20, wherein in said setting step any of the plurality of operation modes is set, and in said control step the number of candidates of forms selectable in said selection step is determined in each of the plurality of operation modes.

22. An image processing method according to claim 21, wherein the plurality of operation modes includes a first operation mode to form the image on one face of a sheet and a second operation mode to form images on two faces of the sheet, on the basis of the image data input from the image generation source, and wherein in said control step, controlling is performed to set the number of candidates of forms selectable in said selection step to be one when the first operation mode is set in said setting step, and to set the number of candidates of forms selectable in said selection step to be two when the second operation mode is set in said setting step.

23. An image processing method according to claim 22, wherein the plurality of operation modes further includes a third operation mode to form the images on plain sheets, a front cover sheet for a front cover and a back cover sheet for a back cover and to mix the image-formed plain, front cover and back cover sheets with others, and wherein in said control step, controlling is performed such that the number of candidates of forms selectable in said selection step is set to be three when the third operation mode is set in said setting step.

24. An image processing method according to claim 21, wherein the plurality of operation modes includes a first operation mode to form the image on one face of a sheet, a second operation mode to form the images on two faces of the sheet, and a third operation mode to form the images on plain sheets and non-plain sheets and to mix the image-formed plain and non-plain sheets with others, on the basis of the image data input from the image generation source, and wherein in said control step, controlling is performed such that the number of candidates of forms selectable in said selection step is set to be one when the first operation mode is set in said setting step, the number of candidates of forms selectable in said selection step is set to be two when the second operation mode is set, and the number of candidates of forms selectable in said selection step is set to be the number obtained by adding one to the number corresponding to the number of non-plain sheets to be mixed with the plain sheets when the third operation mode is set.

25. An image processing method according to claim 21, wherein the plurality of operation modes includes a first operation mode to form the image on two faces of a sheet, and a second operation mode to form the images on plain sheets and non-plain sheets and to mix the image-formed plain and non-plain sheets with others, and wherein the image data formed on the first face of the sheet and stored in the storage area is different from the image data formed on the second face of the sheet and stored in the storage area when the first operation mode is set in said setting means, and the image data formed on the plain sheet and stored in the storage area is different from the image data formed on the non-plain sheet and stored in the storage area when the second operation mode is set.

26. An image processing method according to claim 25, wherein the second operation mode is to mix image-formed plain sheet and plural non-plain sheets with others and to set the image data stored in the storage area selectable for each of the plural non-plain sheets.

27. An image processing method according to claim 25, wherein the non-plain sheet is the sheet for the cover.

28. An image processing method according to claim 25, wherein the non-plain sheet is an interleaf to be inserted between the successive plain sheets.

29. An image processing method according to claim 21, further comprising a display step of displaying information concerning the form image data for the plurality of forms stored in the storage area, and wherein in said selection step selection of the one or more forms from among the form image data stored in the storage area is enabled on the basis of the information displayed in said display step, and wherein in said control step the displayed contents in said display step are set to be different for each of the plurality of operation modes.

30. An image processing method according to claim 20, wherein the image generation source is an image readout apparatus or a host computer for reading an original image.

31. An image processing method for processing a job that includes a series of image data input from an image generation source and outputting the processed data to an image formation apparatus which can selectively perform one of a plurality of operation modes for the job, said method comprising:

a storage step of storing image data to be synthesized to the image data input from the image generation source, in a storage area;

a selection step of selecting image data from the image data stored in the storage area;

a synthesis output step of performing a synthesis process for the image data selected in said selection step and the image data input from the image generation source, and outputting the data subjected to the synthesis process to the image formation apparatus; and a control step of performing controlling to set a selection method in said selection step to be different for each of the plurality of operation modes included in the image formation apparatus.

32. An image processing method according to claim 31, further comprising a display step of displaying information concerning the image data stored in the storage area, and wherein in said selection step image data is selected from the image data stored in the storage area, on the basis of the information displayed in said display step, and wherein in said control step the displayed contents in said display step are set to be different for each of the plurality of operation modes.

33. An image processing method according to claim 31, wherein in said control step the number of image data selectable in said selection step is determined for each of the plurality of operation modes.

34. An image processing method according to claim 33, wherein the plurality of operation modes includes a first operation mode to form an image on one face of a sheet, a second operation mode to form images on two faces of the sheet, and a third operation mode to form images on plain sheets and non-plain sheets and to mix the image-formed plain and non-plain sheets with others, on the basis of the image data input from the image generation source, and wherein in said control step controlling is performed such that the number of image data selectable in said selection step is set to be one when the first operation mode is set in said setting step, the number of image data selectable in said selection step is set to be two when the second operation mode is set, and the number of image data selectable in said selection step is set to be the number obtained by adding one to the number corresponding to the number of non-plain sheets to be mixed with the plain sheets when the third operation mode is set.

35. An image processing method for performing an image process to image data input from an image generation source and outputting the processed image data to an image formation apparatus for forming an image on a sheet on the basis of the image data and an operation mode, said method comprising:

a storage step of storing image data to be synthesized to the image data input from the image generation source, in a storage area;

a selection step of selecting image data from the image data stored in the storage area; and a synthesis output step of performing a synthesis process for the image data selected in said selection step and the image data input from the image generation source, and outputting the data subjected to the synthesis process to the image formation apparatus, wherein, in a case where the operation mode of the image formation apparatus is the mode to form the images on plain sheets and non-plain sheets and to mix the image-formed plain and non-plain sheets with others, the maximum number of image data selectable in said selection step is set to be the number obtained by adding one to the number corresponding to a number of non-plain sheets to be mixed with the plain sheets.

36. An image processing method according to claim 35, wherein the non-plain sheets are cover sheets, and the cover sheets include a front cover sheet and a back cover sheet.

37. An image processing method according to claim 35, wherein the non-plain sheet is an interleaf to be inserted between successive plain sheets.

38. An image processing method for performing an image process to image data input from an image generation source and outputting the processed image data to an image formation apparatus for forming an image on a sheet on the basis of the image data and an operation mode, said method comprising:

a setting step of setting the operation mode of the image formation apparatus;

a storage step of storing image data to be synthesized to the image data input from the image generation source, in a storage area;

a selection step of selecting image data from the image data stored in the storage area; and a synthesis output step of performing a synthesis process for the image data selected in said selection step and the image data input from the image generation source, and outputting the data subjected to the synthesis process to the image formation apparatus, wherein, in a case where the operation mode set in said setting step is a mode to form images on two faces of a sheet, it is possible in said selection step to independently select the image data to be formed on a first face of the sheet and the image data to be formed on a second face of the sheet, and in a case where the operation mode is a mode to form images on plain sheets and non-plain sheets and to mix the image-formed plain and non-plain sheets with others, it is possible in said selection step to independently select the image data to be formed on the plain sheet and the image data to be formed on the non-plain sheet.

39. A computer-readable storage medium which stores a program to cause an image processing apparatus to process a job that includes a series of image data input from an image generation source and output the processed data to an image formation apparatus which can selectively perform one of a plurality of operation modes for the job, the program comprising code to execute:

a setting step of setting one of the plurality of operation modes for the job;

a storage step of storing form image data for a plurality of forms in a storage area;

a selection step of enabling selection of one or more of the plurality of forms to be used in the job from the form image data stored in the storage area;

a synthesis output step of performing a synthesis process for the one or more forms selected for the job in said selection step and the image data of the job input from the image generation source, and outputting the data subjected to the synthesis process to the image formation apparatus; and a control step of controlling a number of candidates of forms selectable for the job in said selection step in accordance with the operation mode set for the job in said setting step.

40. A computer-readable storage medium according to claim 39, wherein in said setting step any of the plurality of operation modes is set, and in said control step the number of the candidates of forms selectable in said selection step is determined in each of the plurality of operation modes.

41. A computer-readable storage medium according to claim 40, wherein the plurality of operation modes includes a first operation mode to form the image on one face of a sheet and a second operation mode to form the images on two faces of the sheet, on the basis of the image data from the image generation source, and wherein in said control step, controlling is performed to set the number of candidates of forms selectable in said selection step to be one when the first operation mode is set in said setting step, and to set the number of candidates of forms selectable in said selection step to be two when the second operation mode is set in said setting step.

42. A computer-readable storage medium according to claim 41, wherein the plurality of operation modes further includes a third operation mode to form the images on plain sheets, a front cover sheet for a front cover and a back cover sheet for a back cover and to mix the image-formed plain, front cover and back cover sheets with others, and wherein in said control step, controlling is performed such that the number of candidates of forms selectable in said selection step is set to be three when the third operation mode is set in said setting step.

43. A computer-readable storage medium according to claim 40, wherein the plurality of operation modes includes a first operation mode to form the image on one face of a sheet, a second operation mode to form the images on two faces of the sheet, and a third operation mode to form the images on plain sheets and non-plain sheets and to mix the image-formed plain and non-plain sheets with others, on the basis of the image data input from the image generation source, and wherein in said control step, controlling is performed such that the number of candidates of forms selectable in said selection step is set to be one when the first operation mode is set in said setting step, the number of candidates of forms selectable in said selection step is set to be two when the second operation mode is set, and the number of candidates of forms selectable in said selection step is set to be the number obtained by adding one to the number corresponding to the number of non-plain sheets to be mixed with the plain sheets when the third operation mode is set.

44. A computer-readable storage medium according to claim 40, wherein the plurality of operation modes includes a first operation mode to form the image on two faces of a sheet, and a second operation mode to form the images on plain sheets and non-plain sheets and to mix the image-formed plain and non-plain sheets with others, and wherein the image data formed on the first face of the sheet and stored in the storage area is different from the image data formed on the second face of the sheet and stored in the storage area when the first operation mode is set in said setting means, and the image data formed on the plain sheet and stored in the storage area is different from the image data formed on the non-plain sheet and stored in the storage area when the second operation mode is set.

45. A computer-readable storage medium according to claim 44, wherein the second operation mode is to mix the image-formed plain sheet and plural non-plain sheets with others and to set the image data stored in the storage area selectable for each of the plural non-plain sheets.

46. A computer-readable storage medium according to claim 44, wherein the non-plain sheet is the sheet for the cover.

47. A computer-readable storage medium according to claim 44, wherein the non-plain sheet is an interleaf to be inserted between successive plain sheets.

48. A computer-readable storage medium according to claim 40, wherein said program causes the image processing apparatus to further execute a display step of displaying information concerning the form image data stored in the storage area,
wherein in said selection step selection of the one or more forms from the form image data stored in the storage area, on the basis of the information displayed in said display step, and
wherein in said control step the displayed contents in said display step are set to be different for each of the plurality of operation modes.

49. A computer-readable storage medium according to claim 39, wherein the image generation source is an image readout apparatus or a host computer for reading an original image.

50. A computer-readable storage medium which stores a program to cause an image processing apparatus to process a job that includes a series of image data input from an image generation source and outputs the processed data to an image formation apparatus which can selectively perform one of a plurality of operation modes for the job, the program comprising code to execute:
a storage step of storing image data to be synthesized to the image data input from the image generation source, in a storage area;
a selection step of selecting image data from the image data stored in the storage area;
a synthesis output step of performing a synthesis process for the image data selected in said selection step and the image data input from the image generation source, and outputting the data subjected to the synthesis process to the image formation apparatus; and
a control step of performing controlling to set a selection method in said selection step to be different for each of the plurality of operation modes included in the image formation apparatus.

51. A computer-readable storage medium according to claim 50, wherein said program causes the image processing apparatus to further execute a display step of displaying information concerning the image data stored in the storage area,
wherein in said selection step the image data is selected from the image data stored in the storage area, on the basis of the information displayed in said display step, and
wherein in said control step the displayed contents in said display step are set to be different for each of the plurality of operation modes.

52. A computer-readable storage medium according to claim 50, wherein in said control step the number of image data selectable in said selection step is determined for each of the plurality of operation modes.

53. A computer-readable storage medium according to claim 52, wherein the plurality of operation modes includes a first operation mode to form an image on one face of a sheet, a second operation mode to form images on two faces of the sheet, and a third operation mode to form images on plain sheets and non-plain sheets and to mix the image-formed plain and non-plain sheets with others, on the basis of the image data input from the image generation source, and
wherein in said control step controlling is performed such that the number of image data selectable in said selection step is set to be one when the first operation mode is set in said setting step, the number of image data selectable in said selection step is set to be two when the second operation mode is set, and the number of image data selectable in said selection step is set to be the number obtained by adding one to the number corresponding to the number of non-plain sheets to be mixed with the plain sheets when the third operation mode is set.

54. A computer-readable storage medium which stores a program to cause an image processing apparatus to process a job that includes a series of image data input from an image generation source and outputs the processed image data to an image formation apparatus for forming an image on a sheet on the basis of the image data and an operation mode, the program comprising code to execute:
a storage step of storing image data to be synthesized to the image data input from the image generation source, in a storage area;
a selection step of selecting image data from the image data stored in the storage area; and
a synthesis output step of performing a synthesis process for the image data selected in said selection step and the image data input from the image generation source, and outputting the data subjected to the synthesis process to the image formation apparatus,
wherein, in a case where the operation mode of the image formation apparatus is a mode to form images on plain sheets and non-plain sheets and to mix the image-formed plain and non-plain sheets with others, the maximum number of image data selectable in said selection step is set to be the number obtained by adding one to the number corresponding to the number of non-plain sheets to be mixed with the plain.

55. A computer-readable storage medium according to claim 54, wherein the non-plain sheets are cover sheets, and the cover sheets include a front cover sheet and a back cover sheet.

56. A computer-readable storage medium according to claim 54, wherein the non-plain sheet is an interleaf to be inserted between the successive plain sheets.

57. A computer-readable storage medium which stores a program to cause an image processing apparatus to process a job that includes a series of image data input from an image generation source and outputs the processed image data to an image formation apparatus for forming an image on a sheet on the basis of the image data and an operation mode, the program comprising code to execute:

a setting step of setting the operation mode of the image formation apparatus;

a storage step of storing image data to be synthesized to image data input from the image generation source, in a storage area;

a selection step of selecting image data from the image data stored in the storage area; and a synthesis output step of performing a synthesis process for the image data selected in said selection step and the image data input from the image generation source, and outputting the data subjected to the synthesis process to the image formation apparatus, wherein, in a case where the operation mode set in said setting step is a mode to form images on two faces of a sheet, it is possible in said selection step to independently select the image data to be formed on a first face of the sheet and the image data to be formed on a second face of the sheet, and in a case where the operation mode is a mode to form images on plain sheets and non-plain sheets and to mix the image-formed plain and non-plain sheets with others, it is possible in said selection step to independently select the image data to be formed on the plain sheet and the image data to be formed on the non-plain sheet.

* * * * *